(12) United States Patent
Mani

(10) Patent No.: US 10,896,674 B2
(45) Date of Patent: Jan. 19, 2021

(54) ADAPTIVE ENHANCEMENT OF SPEECH SIGNALS

(71) Applicant: KAAM LLC., Saratoga, CA (US)

(72) Inventor: Senthil Kumar Mani, Hyderabad (IN)

(73) Assignee: KAAM LLC, Saratoga, CA (US)

(*) Notice: Subject to any disclaimer, the term of this patent is extended or adjusted under 35 U.S.C. 154(b) by 212 days.

(21) Appl. No.: 15/951,708

(22) Filed: Apr. 12, 2018

(65) Prior Publication Data

US 2019/0318733 A1 Oct. 17, 2019

(51) Int. Cl.
*G10L 15/20* (2006.01)
*G10L 25/84* (2013.01)
*G10L 15/22* (2006.01)

(52) U.S. Cl.
CPC ............ *G10L 15/20* (2013.01); *G10L 15/22* (2013.01); *G10L 25/84* (2013.01)

(58) Field of Classification Search
CPC ....... G10L 21/0208; G10L 2021/02165; G10L 21/0232; G10L 2021/02166; G10L 25/18; G10L 19/12; G10L 19/26
See application file for complete search history.

(56) References Cited

U.S. PATENT DOCUMENTS

| | | | | |
|---|---|---|---|---|
| 9,818,421 B2* | 11/2017 | Ravelli | .................. | G10L 19/12 |
| 2014/0025374 A1* | 1/2014 | Lou | ..................... | G10L 21/0216 |
| | | | | 704/203 |
| 2015/0112672 A1* | 4/2015 | Giacobello | .......... | H04M 9/082 |
| | | | | 704/233 |
| 2017/0103775 A1* | 4/2017 | Xu | ......................... | H04R 3/005 |
| 2018/0075859 A1* | 3/2018 | Song | ....................... | G10L 19/06 |
| 2018/0090158 A1* | 3/2018 | Jensen | ................. | H04R 25/407 |
| 2018/0167747 A1* | 6/2018 | Kuriger | ............... | H04R 25/453 |
| 2018/0233158 A1* | 8/2018 | Ray | .................... | G10L 21/0208 |

OTHER PUBLICATIONS

Loganathan, Pradeep, Andy WH Khong, and Patrick A. Naylor. "A class of sparseness-controlled algorithms for echo cancellation." IEEE transactions on audio, speech, and language processing 17, No. 8 (2009): 1591-1601. (Year: 2009).*

Widrow, et al., "Adaptive Noise Cancelling: Principles and Applications", Proceedings of the IEEE, vol. 63, No. 12, Dec. 1975, pp. 1692-1716.

(Continued)

*Primary Examiner* — Mark Villena
(74) *Attorney, Agent, or Firm* — CHIP

(57) ABSTRACT

A signal processing apparatus that handles an adaptive enhancement of a speech signal, receives a first signal and a second signal from a determined source. At least one of a speech signal or at least one noise signal is present in the first signal or the second signal. The first signal and the received second signal are processed to obtain a processed signal for amplification of a gain associated with the speech signal present in the first signal and the second signal by a determined factor. A signal-to-noise ratio (SNR) associated with the processed signal is greater than or equal to a threshold value. A reference noise signal is obtained from the second signal based on subtraction of an estimated the speech signal present in the received second signal from the processed signal. A processed speech signal is determined based on filtration of the obtained reference noise signal.

21 Claims, 8 Drawing Sheets

(56) References Cited

OTHER PUBLICATIONS

Jeong, et al., "Two-Microphone Kepstrum Approach to Real-Time Speech Enhancement Methods", Institute of Information & Mathematical Sciences, IEEE Xplore, Jan. 2006, pp. 66-74.

Jeong, et al., "A Real-Time Kepstrum Approach to Speech Enhancement and Noise Cancellation", Neurocomputing, vol. 71, No. 1315, 2008, pp. 2635-2649.

Jeong, et al., "Minimum Phase Whitening Filter to Speech Beamforming Technique", IEEE 8th Conference on Industrial Electronics and Applications (ICIEA), 2013, pp. 1388-1392.

Jinsoo Jeong, "An Innovations-Based Noise Cancelling Technique on Inverse Kepstrum Whitening Filter and Adaptive FIR Filter in Beamforming Structure", Sensors, vol. 11, No. 7, Jun. 29, 2011, pp. 6816-6841.

Loganathan, et al., "Frequency-Domain Adaptive Multidelay Algorithm with Sparseness Control for Acoustic Echo Cancellation", 17th European Signal Processing Conference (EUSIPCO 2009), Aug. 24-28, 2009, pp. 2000-2006.

Snell, et al., "Formant Location From LPC Analysis Data", IEEE Transactions on Speech And Audio Processing, vol. 1, No. 2, Apr. 1993, pp. 129-134.

Chen, et al., "New Insights Into the Noise Reduction Wiener Filter", IEEE Transactions on Audio, Speech, and Language Processing, vol. 14, No. 4, Jul. 2006, pp. 1218-1234.

Garofolo, et al., "DARPA Acoustic-Phonetic Continuous Speech Corpus CD-ROM", NISTIR 4930, Feb. 1993, 94 pages.

"Series P: Telephone Transmission Quality, Telephone installations, Local Line Networks", ITU-T P-series Recommendations Supplement 10, Nov. 1988, 10 pages.

"Series G: Transmission Systems and Media, Digital Systems and Networks", ITU-T Recommendation G.168, Jan. 2007, 120 pages.

Chen, et al., "Enhanced Itakura Measure Incorporating Masking Properties of Human Auditory System", Signal Processing 83, vol. 83, No. 7, 2003, pp. 1445-1456.

"Cirrus Logic Audio Card User Documentation", Element 14, Jan. 7, 2016, 21 pages.

Yousefian, et al., "A Dual-Microphone Algorithm that can Cope with Competing-Talker Scenarios", IEEE Transactions on Audio, Speech, and Language Processing, vol. 21, No. 1, Jan. 2013, pp. 145-155.

\* cited by examiner

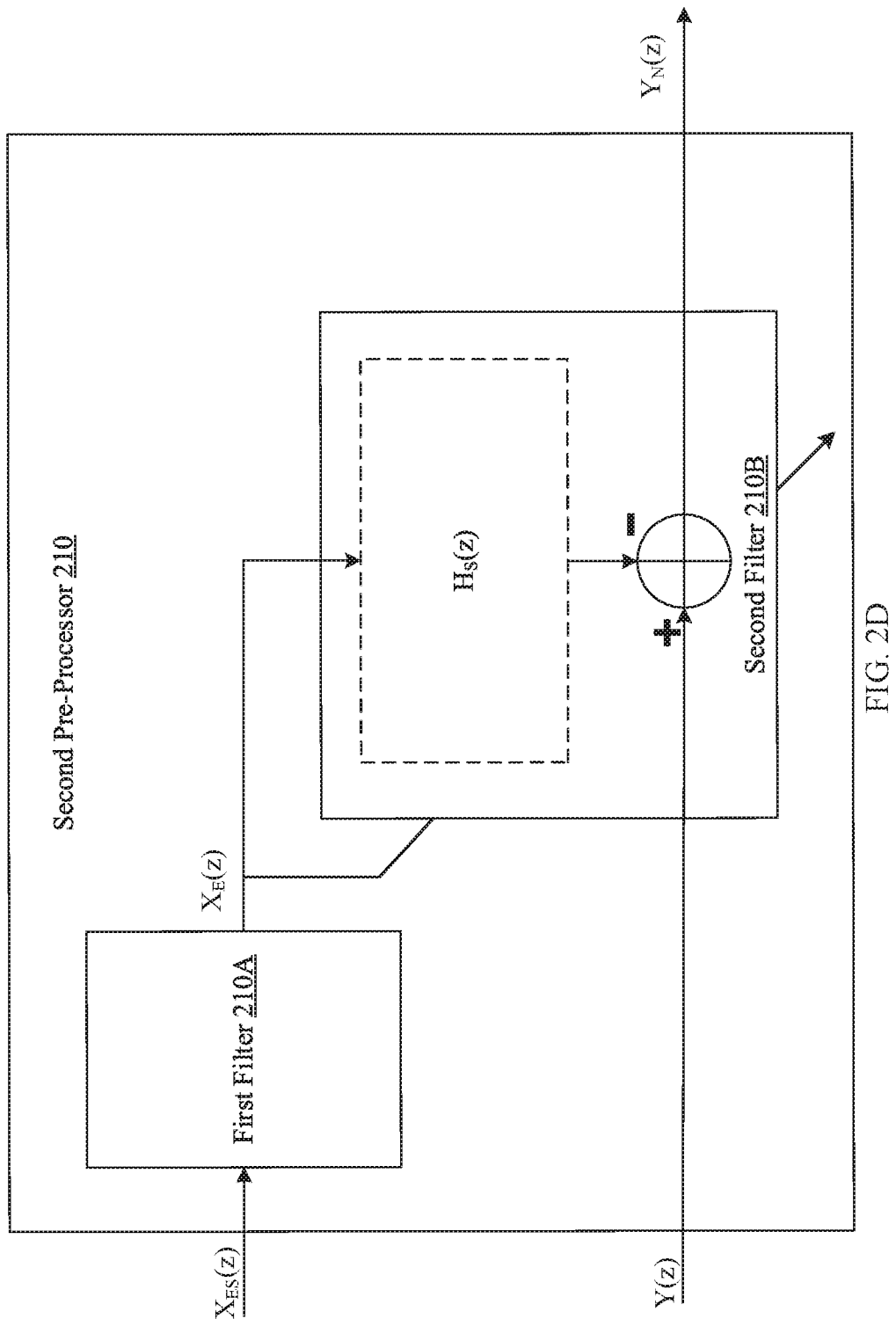

ADAPTIVE ENHANCEMENT OF SPEECH SIGNALS

CROSS-REFERENCE TO RELATED APPLICATIONS/INCORPORATION BY REFERENCE

None.

FIELD OF TECHNOLOGY

Certain embodiments of the disclosure relate to a speech processing system. More specifically, certain embodiments of the disclosure related to system, method, and apparatus for adaptive enhancement of speech signals.

BACKGROUND

In recent years, various technological areas of communication, such as far-field communication, human-machine interactions, and human-human interactions, have witnessed a massive rise in demand for advanced speech enhancement systems with widespread development of various new-generation applications. Existing systems achieve speech enhancement via various advanced methods, such as multi-microphone speech enhancement, which provide better perceived speech intelligibility than traditional speech enhancement methods, such as single-microphone speech enhancement methods. One variant of the multi-microphone speech enhancement is a dual microphone setup (DMS).

In a typical DMS, which further contains adaptive noise canceller system, there are present adaptive filters, such as Noise Estimation Filters (NEF), which estimate noise signals captured by a first microphone based on reference noise signals captured by a second microphone. The second microphone and the first microphone are relatively positioned such that the second microphone captures noise signals that are correlated with the noise signals captured by the first microphone in addition to speech signals. Consequently, the NEF adapts within noise regions, due to which the output of the adaptive noise canceller system comprises an additional distortion component due to presence of speech signal in the second microphone signal. Thus, the output of the adaptive noise canceller system is a distorted output speech.

Various methods are used to resolve the aforesaid problem of distorted output speech. Certain methods model degrading components to improve the speech quality; however, these methods are ineffective in improving the intelligibility of speech signals. Other methods improve speech intelligibility in high signal-to-noise ratio (SNR) regions, but are ineffective in removing the degrading components. Thus, there is desired an intelligent, robust, and high-quality speech enhancement system that overcomes aforesaid problems.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods and/or apparatus are provided for adaptive enhancement of speech signals substantially, as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

FIG. 2D is a block diagram that illustrates an exemplary speech remover as a second pre-processor of the signal processing apparatus of FIG. 2A and FIG. 2B, in accordance with an embodiment of the disclosure.

DETAILED DESCRIPTION OF THE DISCLOSURE

Figure 1:
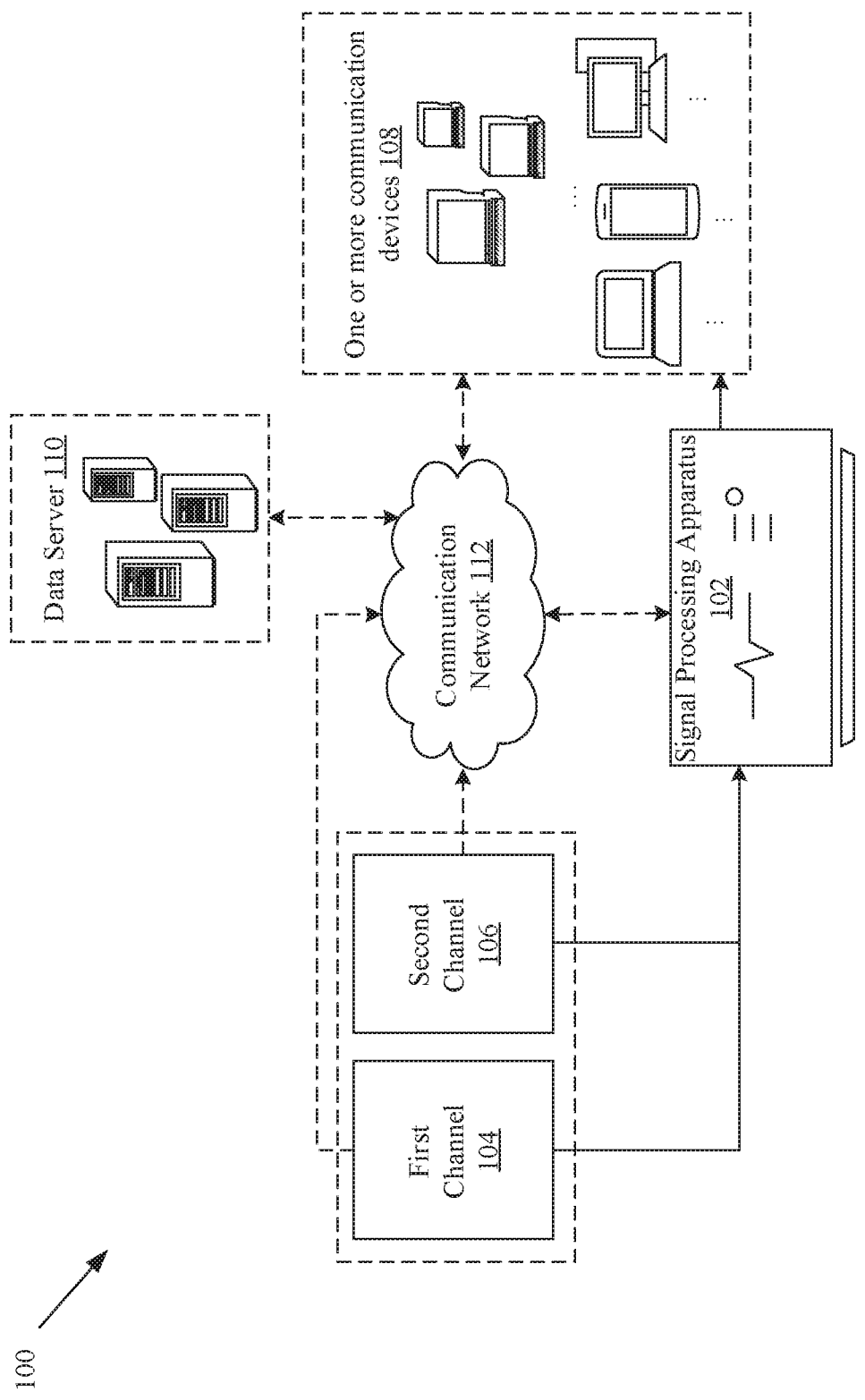
FIG. 1 is a block diagram that illustrates an exemplary network environment for a system for an adaptive enhancement of speech signal, in accordance with an exemplary embodiment of the disclosure.

Certain embodiments of the disclosure may be found in a system, method, and apparatus for an adaptive enhancement of speech signals. Various embodiments of the disclosure provide a system that may include a plurality of circuits in a signal processing apparatus. The plurality of circuits may be configured to receive a first signal and a second signal from a determined source. The first signal comprises at least one of a speech signal or at least one noise signal. The second signal comprises at least one of the speech signal or the at least one noise signal. The plurality of circuits may be configured to obtain a processed signal based on the received first signal and the received second signal. The processed signal may be obtained for amplification of a gain associated with the speech signal present in the received first signal and the second signal. The gain of the processed signal may be amplified by a determined factor. In accordance with an exemplary embodiment, the gain of the processed signal may be amplified by a factor of 2. A signal-to-noise ratio (SNR) associated with the processed signal may be greater than or equal to a threshold value. Further, the plurality of circuits may be configured to obtain a reference noise signal from the received second signal. The reference noise signal may be obtained based on subtraction of a speech signal present in the received second signal from the processed signal. A determination of a processed speech signal may be performed based on filtration of the obtained reference noise signal from the obtained processed signal.

In accordance with an embodiment, at least one circuit of the plurality of circuits may be further configured to estimate a component of noise corresponding to the at least one noise signal in the received second signal. The estimated component of noise may be filtered from the received second signal. The filtered second signal may be obtained that comprises at least one of the speech signal or a reverberated speech signal. At least one circuit of the plurality of circuits may be further configured to obtain a single speech signal based on modification of the at least one of the speech signal or the reverberated speech signal in the filtered second signal. The single speech signal may be associated with a phase and a gain that matches with corresponding phase and gain of the speech signal in the received first signal. Further, the processed signal may be obtained based on a constructive combination of the obtained single speech signal and the received first signal. The processed speech signal may be associated with a gain which may be amplified by the determined factor. The determined factor by which the gain may be amplified is 2.

In accordance with an embodiment, at least one circuit of the plurality of circuits may be configured to determine a noise path impulse response corresponding to a noise path and a speech path impulse response corresponding to a speech path. The noise path may correspond to a path of reception of the at least one noise signal and the speech path may correspond to a path of reception of the speech signal.

In accordance with an embodiment, at least one circuit of a plurality of circuits may be configured to determine each formant in a set of formants in the speech signal which may be present in the received first signal. A formant may correspond to a resonant frequency bin in the speech signal. A defined number of frequency bins of a defined window size adjacent to each determined formant may be identified in the set of formants in a specified pattern for adaptation to the speech signal in the received first signal. Each formant and corresponding frequency bins in the speech signal of the received first signal may be determined from an implementation of a sparseness controlled improved proportionate multiline delay filtering technique (SC-IPMDF). The at least one circuit of the plurality of circuits may be configured to estimate an adapted step-size corresponding to each determined formant and each frequency bin of the identified defined number of frequency bins in the speech signal present in the received first signal. The speech signal may be filtered from the at least one noise signal on the basis of the estimated step-size.

FIG. 1 is a block diagram that illustrates an exemplary communication environment associated with a speech enhancement system for an adaptive enhancement of speech signals, in accordance with an exemplary embodiment of the disclosure. Referring to FIG. 1, there is shown a communication environment 100 that comprises a signal processing apparatus 102, a first channel 104, a second channel 106, one or more communication devices 108, a data server 110, and a communication network 112.

In accordance with an embodiment, as illustrated in FIG. 1, the first channel 104, the second channel 106, the one or more communication devices 108, and the data server 110 may be communicatively coupled to the signal processing apparatus 102, via the communication network 112, to form a speech processing system. However, the disclosure may not be so limited, and in accordance with another embodiment, the first channel 104, the second channel 106, the signal processing apparatus 102, and one of the one or more communication devices 108 may be integrated to form a single entity, without deviation from the scope of the disclosure.

The communication environment 100 may correspond to a closed environment or an open environment. Examples of the closed environment may include, but are not limited to, interiors of offices, stores, vehicles, indoor stadiums, airplane, and halls. Examples of the open environment may include, but are not limited to, road, outdoor stadiums, swimming pools, rocky terrains, and ship decks. In accordance with an exemplary embodiment, the communication environment 100 may be a diffused noise environment in which at least one noise signal at the first channel 104 and the second channel 106 may behave as diffused noise fields. In general, a diffused noise field may be characterized by the at least one noise signal of equal power at each location around the first channel 104 and the second channel 106 of the communication environment 100.

The signal processing apparatus 102 may comprise suitable logic, circuitry, and interfaces that may be configured to process multi-channel signals for an amplification in corresponding SNR of a speech component. The signal processing apparatus 102 may be an apparatus that may perform a defined set of operations. Examples of the defined set of operations may include, but are not limited to, determination of signal amplification and filtration coefficients, one or more discrete signal transforms, one or more filter coefficients, one or more responses, and signal arithmetic. Each operation of the defined set of operations may be performed by the signal processing apparatus 102 in conjunction with stored logic and/or circuitries. Such logic and/or circuitries may be implemented as a computer-readable program that may comprise computer readable instructions or may be implemented on a programmable logic device which may comprise hardware with computer programmable and logically connected circuitries. In accordance with an example, the signal processing apparatus 102 may be a field programmable gate array (FPGA) device. In accordance with another example, the signal processing apparatus 102 may be a distributed network of FPGA devices. Each FPGA device may be configured to perform a specific operation on the dual channel signals. In accordance with yet another example, the signal processing apparatus 102 may be implemented on a programmable application specific integrated circuits (PL-ASIC) or may be partially or completely implemented on at least one of an application specific integrated circuit (ASIC) or a combination of ASIC and FPGA devices.

The first channel 104 may comprise suitable logic, circuitry, and interfaces that may be configured to receive a first signal and communicate the received first signal to the signal processing apparatus 102. The first signal may comprise at least one of the speech signal or at least one noise signal (hereinafter referred to as "one or more noise signals"). At times, the first signal may comprise at least one silence region between the speech signal and the one or more noise signals. Such silence region may be devoid of the speech signal, and at times, electrical noise from circuitry of the first channel 104 or the signal processing apparatus 102 may be present in the silence regions. The first channel 104 may correspond to a primary speech channel that may receive corresponding speech and noise signals from determined sources. The first channel 104 may be realized by various hardware devices, for example a transducer, configured to provide an interface for conversion of signals from speech signals to electrical signals and transmission of such converted electrical signals to the signal processing apparatus 102.

The second channel 106 may comprise suitable logic, circuitry, and interfaces that may be configured to receive a second signal and communicate the received second signal to the signal processing apparatus 102. The second signal may comprise at least one of the speech signal or one or more noise signals or none. At times, the second signal may comprise at least one silence region between the speech signal and the one or more noise signals. Such silence region may be devoid of the speech signal, and at times, electrical noise from circuitry of the second channel 106 or the signal processing apparatus 102 may be present in the silence region. The second channel 106 may correspond to a primary noise channel that may receive corresponding speech and noise signals from the determined source. The determined source may further comprise a defined speech source or at least one noise source. For example, a user, located in vicinity of the first channel 104 or the second channel 106, may be the defined speech source. Alternatively, a group of users, in a collaborative communication environment, may be the defined speech source. Realization of the second channel 106 is similar to the realization of the first channel 104, as described above.

The one or more communication devices 108 may comprise suitable logic, circuitry, and interfaces that may be configured to receive a processed speech signal from the signal processing apparatus 102. Each communication device of the one or more communication devices 108 may be communicatively coupled with the signal processing apparatus 102, via the communication network 112. Each communication device may be a networked or a stand-alone computation device that is configured to perform one or more tasks. The one or more tasks may include, but are not limited to, storage, broadcast, speech-to-text translation, speech-to-speech translation, and speech analysis tasks. Examples of the one or more communication devices 108 may include, but are not limited to, workstations, servers, laptops, desktop computers, mobile devices, non-mobile devices, input/output (I/O) devices, and virtual machines.

The data server 110 may comprise suitable logic, circuitry, and interfaces that may be configured to receive, manage, store, and communicate data with at least one of the signal processing apparatus 102 and the one or more communication devices 108, via the communication network 112. The data may be a digitized storable version of one or more of the first signal, the second signal, the one or more noise signals, and processed speech signal. Additionally, the data server 110 may be further configured to store a defined set of characteristics, a set of computations, a set of signal processing models, and a set of parameters. The data in the data server 110 may be stored and managed as a collated, uncollated, structured, or unstructured set of databases in real time. As an example, a digitized form of the first signal and the second signal, received from corresponding first channel 104 and the second channel 106 respectively, may be stored in the data server 110.

The communication network 112 may comprise suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 112 may be associated with an application layer for implementation of communication protocols based on one or more communication requests from at least one of the one or more communication devices 108. The communication data may be transmitted or received, via the communication protocols. Examples of the communication protocols may include, but are not limited to, HTTP (Hypertext Transfer Protocol), FTP (File Transfer Protocol), SMTP (Simple Mail Transfer Protocol), DNS (Domain Network System) protocol, and CMIP (Common Management Interface Protocol).

In accordance with an embodiment, the communication data may be transmitted or received via at least one communication channel of the plurality of communication channels in the communication network 112. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the first channel 104 and the second channel 106 may be configured to receive a first signal and a second signal, respectively, from determined sources in the communication environment 100. The determined sources may include a speech source and a noise source. The received first signal may comprise at least one of a speech signal received from the speech source or one or more noise signals received from the noise source. The received second signal may comprise at least one of the speech signal or the one or more noise signals or silence regions. At times, the first signal or the second signal may comprise at least one silence region and such silence region may be devoid of the speech signal and at times, may comprise electrical noise signals from circuitry of the first channel 104, the second channel 106, or the signal processing apparatus 102. A correlation may be required to exist among the one or more noise signals received at the first channel 104 and the second channel 106. The degree of correlation may be based on the type of the communication environment 100, such as a closed environment or an open environment. The degree of correlation may be further based on a relative separation of the first channel 104 and the second channel 106. In accordance with an embodiment, the first channel 104 may be positioned at a relative location with respect to the location of the second channel 106, outside the signal processing apparatus 102, in the communication environment 100. In accordance with another embodiment, the first channel 104 may be positioned at a relative location with respect to the location of the second channel 106 within the signal processing apparatus 102.

In accordance with an embodiment, the speech signal may be provided by the speech source located in the communication environment 100. In an exemplary scenario, the speech source may correspond to a user engaged in a communication with another remote user, via a mobile phone. In such a case, the first channel 104 and the second channel 106 may be realized by dual microphones in the mobile phone at one or both user ends. In another exemplary scenario, the speech source may correspond to a group of users in a conference call, over a digital transmission network or an internet telephony network. In such a case, the first channel 104 and the second channel 106 may be realized by dual microphones in the calling device utilized to conduct the conference call by the group of users.

In accordance with an embodiment, the noise signals may be provided by one or more noise sources located in the communication environment 100. At least one noise source may provide the one or more noise signals in a frequency band which may be greater than or less than a frequency band of the speech signal. Additionally, the frequency band of the one or more noise signals may leak into the frequency band of the speech signal, for example in stereo audio reproduction crosstalk. In accordance with an exemplary embodiment, the one or more noise signals from the at least one noise source may be a deterministic signal from a deterministic noise source. Non-deterministic noise signals from the at least one noise source may be processed on the basis of various techniques known in the art.

In accordance with an embodiment, the speech signal and the one or more noise signals may arrive at the first channel 104 and the second channel 106, via multiple reflections. The reflections may be a result of types of structures or materials present in the communication environment 100. For example, the speech signal and/or the noise signal may suffer multiple reflections at surfaces of tiles, ceiling, furniture, and window blinds in an office facility. In such a case, the speech signal and the noise signal may correspond to a diffused field with reverberation components.

In accordance with an embodiment, the first channel 104 and the second channel 106 may receive the first signal and the second signal in a digitized format, and transmit the same to the signal processing apparatus 102, via direct wired connections in the communication environment 100. In accordance with another embodiment, the first channel 104 and the second channel 106 may receive the first signal and the second signal in an analog format. In such a case, the first channel 104 and the second channel 106 may be further configured to perform various signal processing operations, such as multiplexing, sampling, quantization, digitization, or packetization, on the received first signal and the second signal. The first channel 104 and the second channel 106 may be further configured to packetize the received first signal and the second signal as a set of frames. Each frame may be characterized by various attributes, such as a bit rate, a duration, a sampling frequency, or a number of channels. For example, a frame may be characterized by a bit rate of "(48×2×16×500 Bits/Sec (BPS)" or 1500 kbps" for a frame size duration of "2 milliseconds", a sampling frequency of "48 KHz", and "2" channels. Accordingly, the first channel 104 and the second channel 106 may transmit (and encode or transcode) the processed first signal and the second signal to the signal processing apparatus 102 via the communication network 112. It may be noted that the configuration of the above described embodiments for communication of the first signal or the second signal to the signal processing apparatus 102 may not be construed to limit the scope of the disclosure. Various other configurations may be implemented to communicate the first signal or the second signal to the signal processing apparatus 102, without deviation from the scope of the disclosure.

In accordance with an embodiment, the signal processing apparatus 102 may be configured to receive the first signal and the second signal from the first channel 104 and the second channel 106, respectively, via the communication network 112. The signal processing apparatus 102 may comprise one or more configurable or programmable pre-processors and post-processors, described below in brevity in FIG. 1 and described in detail in FIGS. 2A to 2D.

A first pre-processor may comprise adaptive filters configured to process the first signal received from the first channel 104 and the second signal received from the second channel 106 to obtain a processed signal. The processed signal may correspond to a beamformed signal which may be characterized by amplification in the gain of the speech signal and stability (or improvement) in the SNR of the first signal.

A second pre-processor may be configured to estimate the speech signal in the received second signal and obtain a reference noise signal from cancellation of the speech signal from the received second signal. The cancellation of the speech signal may be associated with a subtraction operation on the first signal received from the first channel 104 and the second signal received from the second channel 106.

A post-processor may be configured to filter the reference noise signal from the processed signal to obtain a processed speech signal. In other words, the reference noise signal may be subtracted from the processed signal to obtain the processed speech signal. The processed speech signal may be characterized as a speech signal with an amplified (or enhanced) gain and a significantly high SNR. In accordance with an embodiment, the processed speech signal may be characterized by amplification in the gain of the received speech signal by a determined factor, such as 2. The processed speech signal may be a digital sampled, compressed, and/or packetized signal data that may be associated with a defined set of characteristics. Examples of the defined set of characteristics may include, but are not limited to, a bit rate, a sampling rate, a pitch value, formant frequencies, a signal bandwidth, and a compression factor. Additionally, the defined set of characteristics may include prosody in the processed speech signal. In general, the prosody corresponds to the suprasegmental features of the processed speech signal which may include a factor of intonation, stress, rhythm, tone, accent, and the like. In other words, prosody propagates a sense of emotion, mood, sentiment, and accent to a listener. Such features are intended to be saved in conjunction with the processing of the first signal and the second signal. As an example, the processed speech signal may be sampled at "48000 Hz", encoded with "8-bits" per quantized sample, and may be associated with the signal bandwidth of "1500 Hz".

In accordance with an embodiment, the signal processing apparatus 102 may be configured to transmit the processed speech signal to the one or more communication devices 108, via the communication network 112. In accordance with an embodiment, the signal processing apparatus 102 may be configured to transmit the processed speech signal to the data server 110, via the communication network 112, for storage in real time.

It may be noted that, as described above, the signal processing apparatus 102 processes the first signal and the second signal to obtain the processed speech signal of significantly high SNR, clarity, and quality. However, without deviation from the scope of the disclosure, the signal processing apparatus 102 may not be required to process (or filter) signals (or electrical noises) in the silence regions within the first signal or the second signal, and without prior adaptation of various adaptive filters in the signal processing apparatus 102.

Figure 2A:
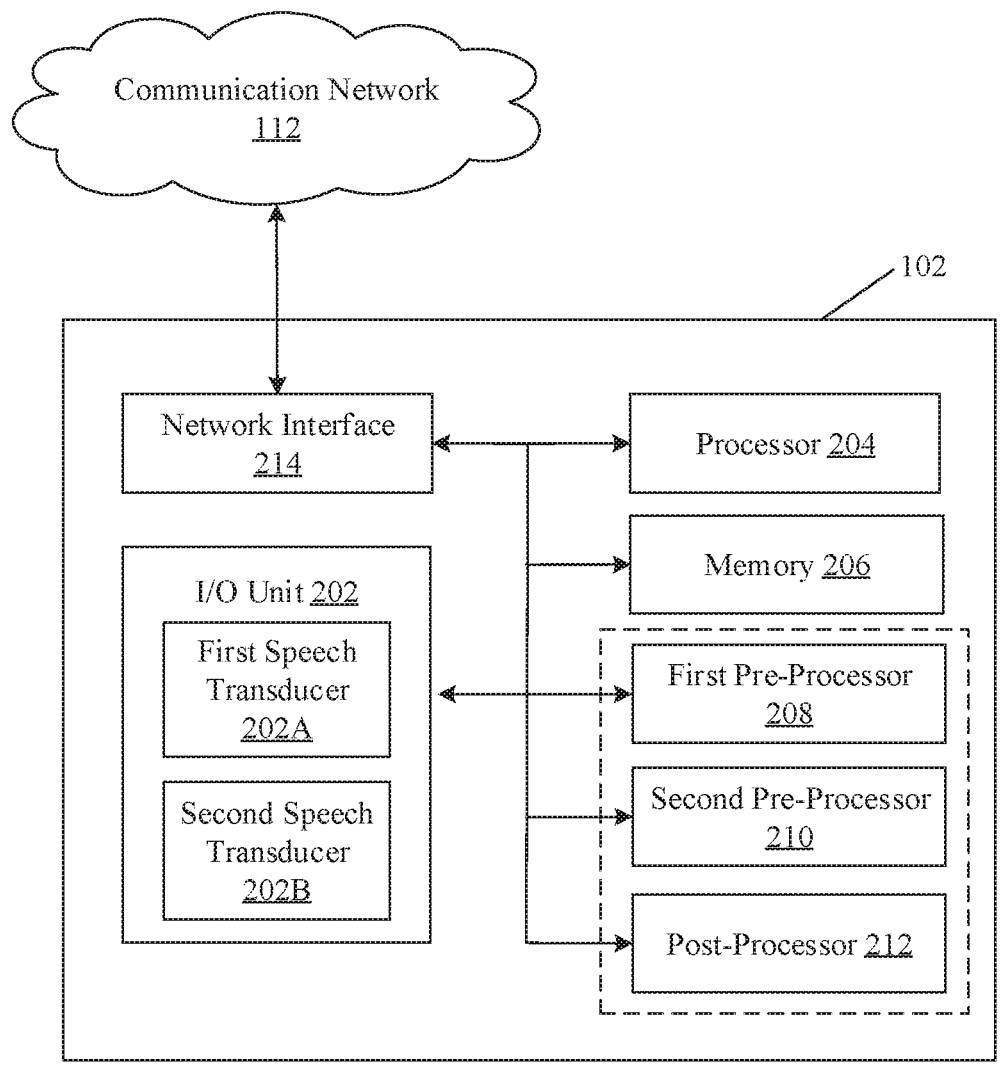
FIG. 2A is a block diagram that illustrates an exemplary signal processing apparatus for an adaptive enhancement of speech signal, in accordance with an exemplary embodiment of the disclosure.

FIG. 2A is a block diagram that illustrates an exemplary signal processing apparatus for adaptive enhancement of speech signals, in accordance with an exemplary embodiment of the disclosure. FIG. 2A is described in conjunction with FIGS. 2B to 2D. With reference to FIG. 2A, there is shown a block diagram of the signal processing apparatus 102 that may include various components, such as an Input/output (I/O) unit 202, a processor 204, a memory 206, a first pre-processor 208, a second pre-processor 210, a post-processor 212, and a network interface 214. Additionally, the signal processing apparatus 102 may comprise one or more transducers in the I/O unit 202, such as a first speech transducer 202A and a second speech transducer 202B, acting as speech input ports for reception of speech and/or noise signals.

In accordance with an embodiment, the processor 204, the memory 206, the first pre-processor 208, the second pre-processor 210, the post-processor 212, and the network interface 214 may be communicatively coupled with each other. The network interface 214 may be configured to communicate with the one or more communication devices 108, via the communication network 112, under the control of the processor 204.

The I/O unit 202 may comprise suitable logic, circuitry, and interfaces that may be configured to receive at least one of the signal data (first signal and/or second signal) from a determined source. Additionally, the I/O unit 202 may receive requests for the signal data from the one or more components, such as the data server 110 or the memory 206, of the signal processing apparatus 102. In accordance with an embodiment, the I/O unit 202, such as speakers, may be configured to render the processed speech signal. Further, the I/O unit 202 may be configured to receive one or more communication requests from external devices, such as the first channel 104, the second channel 106, the one or more communication devices 108, and the data server 110, via the communication network 112 (FIG. 1). An example of a communication request may include, but is not limited to, an authorization request, a read request, a write request, a file access request, a file transfer request, and a debugger request. The I/O unit 202 may include one or more physical communication ports and one or more virtual network ports for enabling concurrent reception and transmission of the one or more communication requests and/or signal data.

Further, the I/O unit 202 may include the first speech transducer 202A and the second speech transducer 202B. The first speech transducer 202A and the second speech transducer 202B may be characterized as transducer devices for conversion of pressure waves of sound emitted from the determined source of speech and noise to an electrical signal. In accordance with an exemplary embodiment, each of the first speech transducer 202A and the second speech transducer 202B is a microphone. The microphone may be associated with a buffer circuitry and a noise suppression circuitry for removal of deterministic noises in the communication environment 100. The first speech transducer 202A may be configured to receive the first signal that may comprise at least one of the speech signals from a user, such as a human speaker or one or more noise signals. Similarly, the second speech transducer 202B may be configured to receive the second signal that may comprise at least one of the speech signal or the one or more noise signals. At times, the first signal or the second signal may comprise at least one silence region and such silence region may be devoid of the speech signal and at times, may comprise electrical noise signals from circuitries of the first speech transducer 202A or the second speech transducer 202B.

The processor 204 may comprise suitable logic, circuitry, and interfaces that may be configured to manage the address bus, the data bus, and general arithmetical, logical, or graphical processes on the basis of a set of instructions stored in the memory 206 of the signal processing apparatus 102. The set of instructions may be executed by the processor 204 based on instructions from at least one of the first pre-processor 208, the second pre-processor 210, and the post-processor 212. Alternatively, the processor 204 may execute a set of instructions communicated via an authorized third party or various peripheral devices. Each set of instructions may correspond to at least one of an arithmetical, logical, or graphical computation task. Examples of the computation task may include, but are not limited to, computation of transforms, responses, quantization, samples, compression factors, and filter coefficients. The set of instructions may further correspond to an authentication, authorization, and/or a validation task. The processor 204 may communicate with the I/O unit 202, the memory 206, the first pre-processor 208, the second pre-processor 210, the post-processor 212, and the network interface 214, via the networked plurality of address and data buses. Further, the performance of execution of the set of instructions by the processor 204 may depend on a processor specification of the processor 204. The processor specification may include, but is not limited to, a clock frequency, a data bus width, a cache memory size, a number of cores, and a primary architecture.

The memory 206 may comprise suitable logic, circuitry, and interfaces that may be configured to store the set of instructions executable by the I/O unit 202, the processor 204, the first pre-processor 208, the second pre-processor 210, and the post-processor 212. Additionally, the memory 206 may be configured to receive the set of instructions (programmable) from one or more external devices for storage via the communication network 112. The storage of the set of instructions in the memory 206 may be persistent or non-persistent. The persistence or non-persistence of the set of instructions in the memory 206 may depend on architecture of the memory 206, which may be static, dynamic, or flash architecture. The choice of architecture for the memory 206 may depend on requirements of the signal processing apparatus 102. For example, the requirement may be a fast cache, a longer persistence of data, a quicker refresh rate, or a faster access to the data present in the memory 206. Examples of memory 206 may include, but are not limited to, a static random access memory (SRAM), a dynamic random access memory (DRAM), a flash memory, an EEPROM, an EPROM, and a PROM. Additionally, the memory 206 may include a magnetic storage drive, or a solid state drive for persistent storage of the data. Alternatively, a set of centralized or distributed network of peripheral memory devices may be interfaced with the signal processing apparatus 102, via the I/O unit 202. As an example, a persistent or non-persistent memory unit on the cloud may be interfaced with the signal processing apparatus 102.

The first pre-processor 208 may comprise suitable logic, circuitry, and interfaces that may be configured to process the received first signal from the first speech transducer 202A and the second signal from the second speech transducer 202B to obtain a processed signal. The processed signal may correspond to a beamformed signal which may be characterized by amplification in the gain of the speech signal and stability (or improvement) in the SNR of the first signal. In accordance with an exemplary embodiment, the first pre-processor 208 may be a spatial filtering unit and specifically, an adaptive delay-sum beamformer. Alternatively, the first pre-processor 208 may be a multi-stage spatial filter which may be configured to render directionality to the received first signal and the second signal. The directionality is required for a phase match of the first signal and the second signal which may otherwise remain unequal. The direction from which a wave front originates may affect a time at which corresponding signals meet each of the first speech transducer 202A and the second speech transducer 202B. Additionally, the first pre-processor 208 may suppress a gain of the one or more noise signals in the received first signal even when the one or more noise signals are present as a diffused noise field or may be uncorrelated across the first signal and second signal.

In accordance with an embodiment, the first pre-processor 208 may comprise a first adaptive filter unit 208A (FIG. 2C) in a first stage of beamforming, for example, delay-sum beamforming. The first adaptive filter unit 208A may be a linear digital filter with a transfer function that may be controlled by one or more variable parameters. The one or more variable parameters may be evaluated through numerous statistical or regression techniques in accordance with dynamic variations of the speech signal and the one or more noise signals.

In accordance with an embodiment, the first adaptive filter unit 208A may correspond to an adaptive filter unit. The adaptability or non-adaptability of the first adaptive filter unit 208A may be conditional. The condition for the adaptability of the first adaptive filter unit 208A may be based on presence of the one or more noise signals in both of the first signal and the second signal. In other words, the first adaptive filter unit 208A is adapted to filter the second signal only when the first signal and the second signal comprises the one or more noise signals. In accordance with another embodiment, the first adaptive filter unit 208A may correspond to a non-adaptive filter unit.

The first adaptive filter unit 208A may be associated with a first transfer function that may be utilized to generate a non-adaptive or adaptive blocking matrix for the first adaptive filter unit 208A. The generated blocking matrix may be utilized to perform filtration (or elementary transformation) of the second signal received from the second speech transducer 202B. Thus, the first adaptive filter unit 208A is primarily configured to estimate and cancel the one or more noise signals from the received second signal with reference to the generated blocking matrix for corresponding first transfer function of the first adaptive filter unit 208A.

The first pre-processor 208 may further comprise a second adaptive filter unit 208B (FIG. 2C) in a second stage of the delay-sum beamforming. In general, the second adaptive filter unit 208B may be a linear digital filter with a second transfer function that may be controlled by the one or more variable parameters. The one or more variable parameters may be evaluated through applications of numerous statistical or regression techniques in accordance with dynamic variations in the speech signal and the one or more noise signals. The second adaptive filter unit 208B may correspond to a non-adaptive filter unit or may correspond to an adaptive filter unit. The adaptability or non-adaptability of the second adaptive filter unit 208B may be conditional. The condition for adaptability of the second adaptive filter unit 208B may be based on presence of the speech signal in the received first signal from the first speech transducer 202A. In other words, the second adaptive filter unit 208B is adapted to process the first signal only when the first signal comprises the speech signal.

The second transfer function may be utilized to generate another non-adaptive or adaptive reshaping matrix for the second adaptive filter unit 208B. The generated reshaping matrix may be utilized to process (or elementarily transform) the filtered second signal from the first adaptive filter unit 208A and the received first signal from the first speech transducer 202A. The second adaptive filter unit 208B is primarily configured to estimate and modify the filtered second signal from the first adaptive filter unit 208A and constructively sum up the modified second signal with the received first signal to obtain the processed signal. The modification or filtration may be performed in accordance with the generated reshaping matrix for corresponding second transfer function of the second adaptive filter unit 208B. The generation and associated operation of the reshaping matrix is known to one skilled in the art and further description of the reshaping matrix is not included for the sake of brevity.

The second pre-processor 210 may comprise suitable logic, circuitry, and interfaces that may be configured to estimate the speech signal in the received second signal and obtain a reference noise signal from cancellation of the speech signal from the received second signal. In other words, the second pre-processor 210 may be configured to remove the speech signal from the received second signal and model the noise component in form of the one or more noise signals as corresponding noise component in the received first signal. Specifically, the first pre-processor 208 primarily models the noise component (as the one or more noise signals) in the communication environment 100 (FIG. 1). The modelled noise component may be used for adaptive cancellation of the one or more noise signals present with the noisy speech signal. In accordance with an embodiment, the second pre-processor 210 may be a speech remover unit which may further comprise one or more adaptive or non-adaptive digital filters.

The second pre-processor 210 may comprise a first filter 210A and a second filter 210B (FIG. 2D). The first filter 210A may be present in a first stage of the second pre-processor 210 and the second filter 210B may be present in a second stage of the second pre-processor 210.

The first filter 210A may comprise suitable logic, circuitry, and interfaces that may be configured to filter the noise component in the processed signal, received from the second adaptive filter unit 208B of the first pre-processor 208. The noise component in the processed signal may be filtered to obtain a filtered first signal. The filtered first signal is an output of the first filter 210A that is a component of the speech remover (or the second pre-processor 210). The first filter 210A may be implemented as a single microphone speech enhancement system or single microphone noise filter. The primary objective of obtaining the filtered first signal from the first filter 210A is to precisely model the speech signal in the received second signal. In other words, the speech signal is significantly redundant in compression of signals as compared to the one or more noise signals. Further, a correlation of the speech signal in the first signal and the second signal pre-dominates a correlation of the component of noise in the first signal and the second signal. Therefore, a short adaptive filter, for example, a Weiner filter, is used as the first filter 210A to obtain the filtered first signal (as the modeled speech signal) for further modelling the speech in the second signal. The filtered first signal from the first filter 210A may be communicated as an input to the second filter 210B.

The second filter 210B may comprise suitable logic, circuitry, and interfaces that may be configured to estimate the speech signal in the received second signal based on the filtered first signal (modeled as the speech signal from the first speech transducer 202A). Additionally, the estimated the speech signal from the received second signal may be filtered (or cancelled) from the received second signal to obtain the reference noise signal. In accordance with an embodiment, the second filter 210B may not efficiently filter (or cancel) the estimated the speech signal from the second signal. Therefore, the second filter 210B may be adapted for a speech estimation error when the speech signal is present in both of the received first signal and the received second signal. In accordance with another embodiment, the second filter 2108 may efficiently filter (or cancel) the estimated the speech signal from the second signal. Therefore, the reference noise signal may be considered as a suitable approximate model of the one or more noise signals in the communication environment 100.

The post-processor 212 may comprise suitable logic, circuitry, and interfaces that may be configured to filter the reference noise signal from the processed signal to obtain a processed speech signal. In other words, the reference noise signal may be subtracted from the processed signal to obtain the processed speech signal. The processed speech signal may be characterized as a speech signal with an amplified (or enhanced) gain and a significantly high SNR. In accordance with an embodiment, an adaptive noise canceller (ANC) may be used as the post-processor 212. The ANC is typically configured to receive a first input that comprises the speech signal and the one or more noise signals and a second input that comprises a reference noise signal. The ANC may typically output an enhanced speech signal and an additional noise component which may be present due to an estimation or modeling error of speech or noise.

The post-processor 212 may provide the processed speech output and the processed speech output of the post-processor 212 may contain negligible additional component of noise which may be attributed to prior stages of the first pre-processor 208 and the second pre-processor 210 in the signal processing apparatus 102 depending upon the severity of the noise condition.

The network interface 214 may comprise suitable logic, circuitry, interfaces, and/or code that may be configured to communicate with other systems and devices via the communication network 112. The network interface 214 may be implemented by use of known technologies to support wired or wireless communication of the signal processing apparatus 102 with the communication network 112. Components of the network interface 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 204 may be configured to execute the set of instructions, stored in the memory 206, issued by the at least one of the first pre-processor 208, the second pre-processor 210, the post-processor 212, or the one or more communication devices 108. The processor 204 may execute preliminary (or prerequisite) one or more operations to facilitate execution of operations such as logical or arithmetical operations on the first signal and the second signal, estimation of filter coefficients and matrix operations, transform, and response estimations in accordance with the set of instructions issued to the processor 204. Accordingly, the processor 204 may allocate process threads to each operation, as defined by the set of instructions, for determination of the processed speech signal in real time.

Figure 2B:
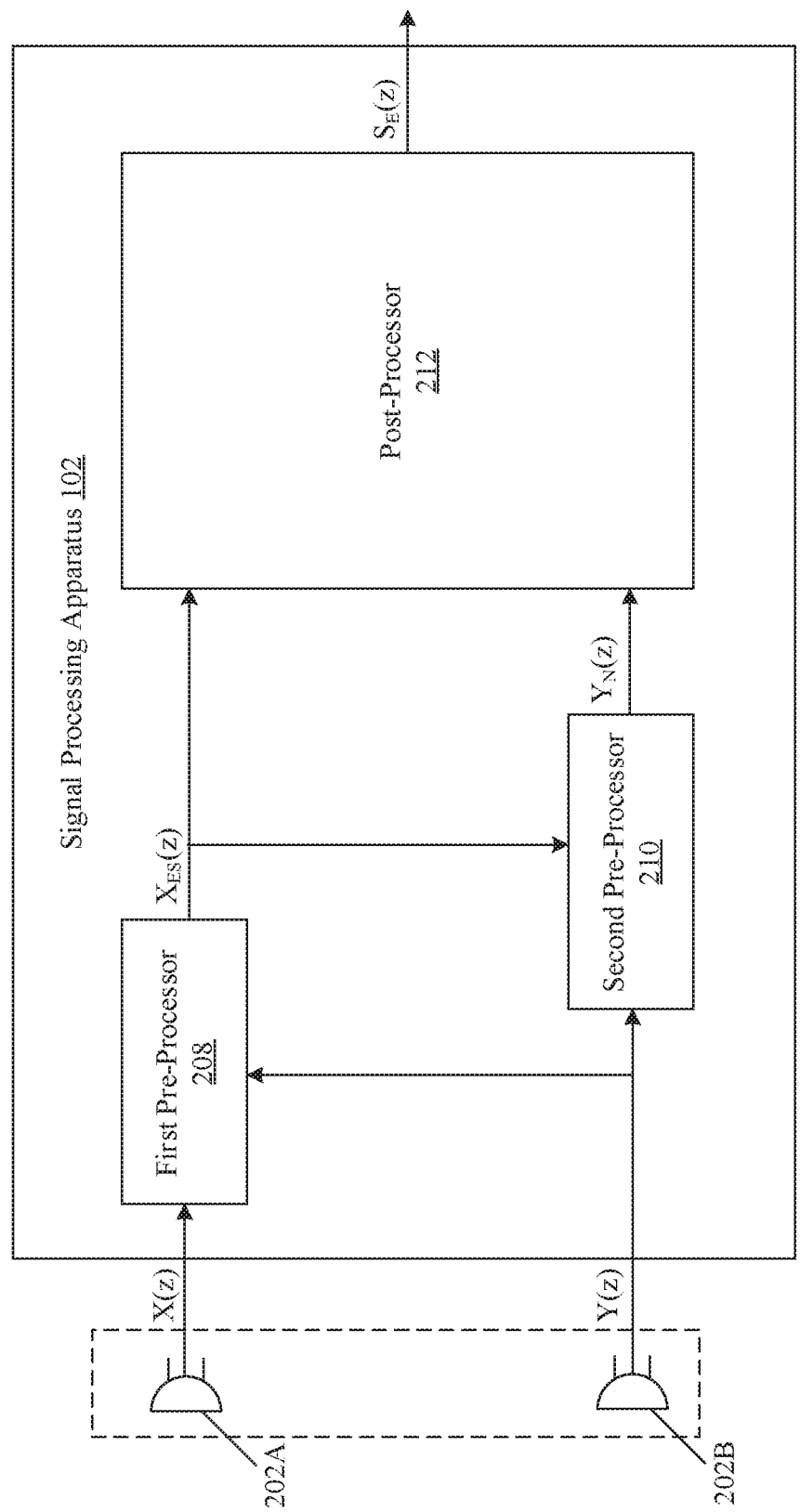
FIG. 2B is a block diagram that illustrates internal circuitry or logic of the signal processing apparatus of FIG. 2A, in accordance with an embodiment of the disclosure.
Figure 2C:
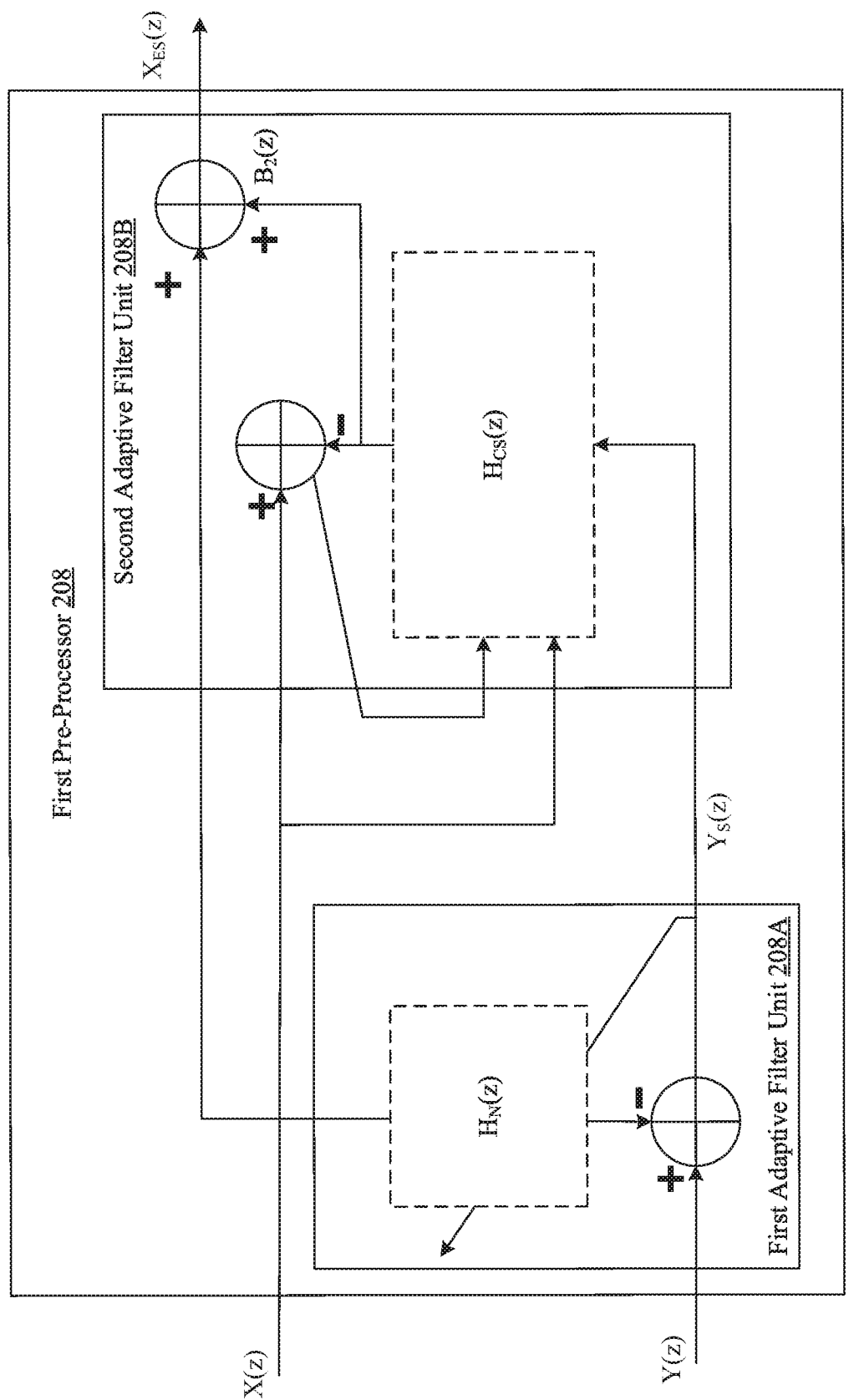
FIG. 2C is a block diagram that illustrates an exemplary beamformer as a first pre-processor of the signal processing apparatus of FIG. 2A and FIG. 2B, in accordance with an embodiment of the disclosure.

In accordance with an embodiment, the first speech transducer 202A and the second speech transducer 202B of the I/O unit 202 may be configured to receive a first signal and a second signal respectively, from a determined source. The first speech transducer 202A and the second speech transducer 202B may be either inbuilt in the I/O unit 202 or present as peripheral component that may be communicatively coupled with the I/O unit 202. The first signal and the second signal may be denoted as the first signal $(X(z))$ and the second signal $(Y(z))$, as shown in FIGS. 2B, 2C, and 2D. Both of the first signal $(X(z))$ and the second signal $(Y(z))$ may comprise one or more signal components. The one or more signal components may be associated with the speech signal, the one or more noise signals, or a combination of the speech signal and the one or more noise signals.

A strength of the speech signal and the one or more noise signals may vary in the first signal $(X(z))$ and the second signal $(Y(z))$. The variation in the strength of the speech signal and the one or more noise signals in the first signal $(X(z))$ and the second signal $(Y(z))$ may depend on a relative position of the defined speech source and the at least one noise source. For example, a human speaker, as the speech source, may be present at a proximal point with respect to the first speech transducer 202A and at a distant point with respect to the second speech transducer 202B. Noise sources, such as other nearby human speakers or undesired sound from surrounding, may be present at a proximal point with respect to both of the first speech transducer 202A and the second speech transducer 202B. As a result, the first speech transducer 202A may receive the speech signal of the human speaker and the noise signal from the noise sources, whereas the second speech transducer 202B may only receive the speech signal from the human speaker, and majorly the noise signal from the noise sources. Thus, the relative position of the defined speech source and the at least one noise source may be responsible for generation of one or more embodiments of the first signal $(X(z))$ and the second signal $(Y(z))$.

The present disclosure may describe the determination of the processed speech signal for four such exemplary embodiments of the first signal and the second signal. However, the description of such four exemplary embodiments may not be construed as limiting and the techniques or devices described for the four exemplary embodiments may be applicable to other possible embodiments of the present disclosure.

In accordance with a first exemplary embodiment, the first signal $(X(z))$ from the first speech transducer 202A, and the second signal $(Y(z))$ from the second speech transducer 202B, may comprise only noise signals. In other words, the first signal $(X(z))$ and the second signal $(Y(z))$ may be devoid of the speech signal.

In accordance with a second exemplary embodiment, the first signal $(X(z))$, from the first speech transducer 202A, and the second signal $(Y(z))$ from the second speech transducer 202B, may comprise only speech signal. In other words, the first signal $(X(z))$ and the second signal $(Y(z))$ may be devoid of noise signals.

In accordance with a third exemplary embodiment, the first signal $(X(z))$ from the first speech transducer 202A, may comprise the speech signal, and the one or more noise signals and the second signal $(Y(z))$ from the second speech transducer 202B, may comprise the one or more noise signals. In other words, the second signal $(Y(z))$ may be devoid of the speech signal while the first signal $(X(z))$ may comprise both the speech signal and the one or more noise signals.

In accordance with a fourth exemplary embodiment, the first signal $(X(z))$ from the first speech transducer 202A, may comprise the one or more noise signals, and the second signal $(Y(z))$ from the second speech transducer 202B, may comprise the speech signal and the one or more noise signals. In other words, the first signal $(X(z))$ may be devoid of the speech signal while the second signal $(Y(z))$ may comprise both the speech signal and the one or more noise signals.

Typically, the first signal $(X(z))$ and the second signal $(Y(z))$ may be received as discrete pressure wave of sound and may be converted to analog signals which may comprise the at least one of the speech signal or the one or more noise signals. Additionally, the first signal (X(z)) and the second signal (Y(z)) may be converted to a digital first signal and a digital second signal from the analog first signal and the analog second signal. In accordance with an embodiment, the analog to digital (A/D) conversion may be performed in at least one or more circuitries of the first speech transducer 202A and the second speech transducer 202B. In accordance with another embodiment, the A/D conversion may be performed by the at least one or more circuitries of the signal processing apparatus 102. Additionally, the conversion may be enabled by implementation of at least one or more digital signal processing techniques which may further implement, for example, a Kepstrum filter, on the digitized first signal and the digitized second signal.

In accordance with an embodiment, a phase delay ($t_d$) may be present between the first signal (X(z)) and the second signal (Y(z)) which may be correlated with the relative separation of the first speech transducer 202A and the second speech transducer 202B. For example, a user may generate a speech signal. The speech signal and an ambient noise signal may reach the first speech transducer 202A at a first time ($t_1$) and the second speech transducer 202B at a second time ($t_2$). The difference in the first time ($t_1$) and the second time ($t_2$) (that is, $t_1$~$t_2$) may be referred to as the phase delay ($t_d$). The phase delay ($t_d$) in the first signal (X(z)) and the second signal (Y(z)) may require compensation or correction for an alignment in phase. The alignment of the phase may facilitate a noise optimized enhancement of the speech signal in the received first signal (X(z)) or the received second signal (Y(z)).

The phase delay ($t_d$) is dependent on relative position of the first speech transducer 202A and the second speech transducer 202B as well as position of the speaker. In accordance with an embodiment, the first speech transducer 202A is positioned at a first location and the second speech transducer 202B is positioned at a second location. The first location of the first speech transducer 202A is pre-specified and correlated with respect to the second location of the second speech transducer 202B. For example, a microphone ($M_1$) may be located at the bottom of a calling device (C) and another microphone ($M_2$) may be located at a back panel of the calling device (C). The microphone ($M_1$) may be positioned primarily for the reception of the speech signal from the speaker and the microphone ($M_2$) may be positioned primarily for reception of the one or more noise signals in the communication environment 100.

The speech signal and the one or more noise signals in either of the first signal (X(z)) or the second signal (Y(z)) may be represented by (S(z)) and (V(z)), respectively. The processor 204 may be configured to evaluate numerous impulse responses between different components of the signal processing apparatus 102 (FIG. 1) and speech or noise sources. A first acoustic impulse response ($A_{11}(z)$) may be evaluated between the defined speech source, such as (S(z)), and the first speech transducer 202A. A second acoustic impulse response ($A_{21}(z)$) may be evaluated between the defined speech source, such as (S(z)), and the second speech transducer 202B. A third acoustic impulse response ($A_{12}(z)$) may be evaluated between the at least one noise source, such as (V(z)), and the first speech transducer 202A. A fourth acoustic impulse response ($A_{22}(z)$) may be evaluated between the at least one noise source, such as (V(z)), and the second speech transducer 202B. The evaluation of acoustic impulse responses, such as the first acoustic impulse response ($A_{11}(z)$), the second acoustic impulse response ($A_{21}(z)$), the third acoustic impulse response ($A_{12}(z)$), and the fourth acoustic impulse response ($A_{22}(z)$), facilitate determination and selection of suitable control and optimization techniques for optimum filter responses, output, errors, convergence rates, and the like. At any time (z), the first signal (X(z)) and the second signal (Y(z)) may be represented by the following equation (1):

$$\begin{bmatrix} X(z) \\ Y(z) \end{bmatrix} = \begin{bmatrix} A_{11}(z) & A_{12}(z) \\ A_{21}(z) & A_{22}(z) \end{bmatrix} \times \begin{bmatrix} S(z) \\ V(z) \end{bmatrix} \quad (1)$$

In accordance with an embodiment, the first speech transducer 202A and the second speech transducer 202B may be remotely coupled with the signal processing apparatus 102. In such a case, the network interface 214 may be configured to communicate the first signal (X(z)) and the second signal (Y(z)), received from the first speech transducer 202A and the second speech transducer 202B respectively, via the communication network 112, to the first pre-processor 208.

The first pre-processor 208, in conjunction with the processor 204, may be configured to perform a pre-processing operation of the signal processing apparatus 102. The pre-processing operation may be performed on the received first signal (X(z)) and the second signal (Y(z)) to provide directionality, gain, and phase alignment to the first signal (X(z)) and the second signal (Y(z)). In accordance with an embodiment, the first pre-processor 208 may be configured to perform the pre-processing operation to process the received first signal (X(z)) and the second signal (Y(z)) to obtain the processed signal ($X_{ES}(z)$) (FIG. 2B). The pre-processing operation may be characterized as a stage-wise computational operation of at least two adaptive filters, such as the first adaptive filter unit 208A and the second adaptive filter unit 208B, in the first pre-processor 208.

In the first stage, the first adaptive filter unit 208A may be configured to process the second signal (Y(z)) for filtration (or removal) of a component of noise from the second signal (Y(z)). Specifically, in the first stage, the first adaptive filter unit 208A may receive the second signal (Y(z)) from the second speech transducer 202B. Alternatively, the first adaptive filter unit 208A may receive the second signal (Y(z)) from a file retrieved from a persistent storage of the signal processing apparatus 102, a cloud, or a network source which hosts the second signal as a file (not shown). The first adaptive filter unit 208A may be characterized by an impulse response ($H_N(z)$) (FIG. 2C) and the output of the first adaptive filter unit 208A may be represented by ($Y_S(z)$) (FIG. 2C). Specifically, the first adaptive filter unit 208A initially estimates a component of noise corresponding to the one or more noise signals in the second signal (Y(z)). The estimation may be based on a received input of the first signal (X(z)) to the first adaptive filter unit 208A. The estimated component of noise is filtered (or cancelled) from the second signal (Y(z)). The filtration of the estimated component of noise from the second signal is performed to obtain the speech signal from the received second signal (Y(z)). The filtered second signal ($Y_S(z)$) (FIG. 2C) comprises the speech signal. The output ($Y_S(z)$) of the first adaptive filter unit 208A may be represented by the following equation (2):

$$Y_S(z)=Y(z)-(H_N(z) \times X(z)) \quad (2)$$

An optimum impulse response ($H_{NO}(z)$) (not shown) may be obtained for the first adaptive filter unit 208A. The first adaptive filter unit 208A is adapted when the first signal (X(z)) and the second signal (Y(z)) includes the one or more noise signals. In such cases, the one or more noise signals may correspond to a diffused noise field and the speech signal may require suitable estimation of step-sizes and filter coefficients. The estimation of the step-sizes and the filter coefficients may facilitate filtration of the component of noise from the second signal (Y(z)). The first adaptive filter unit 208A may obtain the speech signal and a reverberated speech component in the filtered second signal ($Y_S(z)$), for the optimum impulse response ($H_{NO}(z)$) of the first adaptive filter unit 208A. In other words, the reverberated speech signal is a reflected speech signal, which is correlated with the speech signal by phase difference and attenuation. The reverberated speech signal may be generated based on the optimum impulse response ($H_{NO}(z)$) of the first adaptive filter unit 208A and the first signal (X(z)). The optimum impulse response ($H_{NO}(z)$) of the first adaptive filter unit 208A may be a ratio of the fourth acoustic impulse response ($A_{22}(z)$) and the third acoustic impulse response ($A_{12}(z)$). The optimum impulse response ($H_{NO}(z)$) may be represented by following equation (3):

$$H_{NO}(z) = \frac{A_{22}(z)}{A_{12}(z)} \quad (3)$$

The filtered second signal ($Y_S(z)$), referred to as the output ($Y_S(z)$), may be represented by an equation with a first term for the speech signal and a second term for the reverberated speech signal. The output $Y_S(z)$ may be represented by the following equation (4) and (5):

$$Y_S(z)=Y(z)-X(z)\times H_{NO}(z) \quad (4)$$

Or $$Y_S(z)=A_{21}(z)\times S(z)-A_{11}(z)\times S(z)\times H_{NO}(z) \quad (5)$$

The first adaptive filter unit 208A may be configured to communicate the filtered second signal ($Y_S(z)$) to the second adaptive filter unit 208B, coupled to the first adaptive filter unit 208A, for further processing in the second stage.

In the second stage, the second adaptive filter unit 208B may be configured to receive the filtered second signal ($Y_S(z)$) from the first adaptive filter unit 208A and the first signal (X(z)) from the first speech transducer 202A. Accordingly, the second adaptive filter unit 208B may be configured to obtain speech signal based on modification of the speech signal and the reverberated speech signal in the filtered second signal ($Y_S(z)$). In other words, the modification of the at least one of the reverberated speech signal and the speech signal may be a signal or waveform reshaping operation. The speech signal, obtained from the modification operation, may be characterized by a single speech component and therefore, the speech signal is referred to as the single speech signal. The single speech signal may be associated with a phase and a gain that match with corresponding phase and gain of the speech signal in the received first signal (X(z)). The phase difference and attenuation of the reverberated speech signal may be modified to obtain a compensated speech signal whose gain and phase are approximately equal to the speech signal in the received first signal (X(z)). The modification of the reverberated speech signal may correspond to a compensation or correction technique and may be performed by the second adaptive filter unit 208B.

The second adaptive filter unit 208B may obtain the processed signal ($X_{ES}(z)$) (FIG. 2C) based on a constructive addition of the obtained single speech signal ($Y_S(z)$) and the received first signal (X(z)). The speech signal in the processed signal ($X_{ES}(z)$), obtained from the second adaptive filter unit 208B, may be associated with a gain amplified by the determined factor, such as "2". The processed signal ($X_{ES}(z)$) may be a directional, speech enhanced, and noise minimalized speech signal and may be characterized by an amplification in the gain associated with the speech signal. The SNR associated with the processed signal ($X_{ES}(z)$) may be greater than or equal to a threshold value. The processed signal ($X_{ES}(z)$) may be obtained without degradation of the SNR of the processed signal. In other words, the gain of a noise component in the processed signal ($X_{ES}(z)$) may be suppressed and the gain of the speech signal may be amplified. Therefore, the SNR of the processed signal ($X_{ES}(z)$) is greater than or equal to the threshold value. The threshold value may be a lower limit for the SNR, below which the output and response may be considered as "poor". The output of the second adaptive filter unit 208B or the first pre-processor 208 may be referred to as the processed signal ($X_{ES}(z)$).

In accordance with an embodiment, the second adaptive filter unit 208B may be associated with a desired response ($H_{CSO}(z)$), further referred to as an optimum response. The desired response ($H_{CSO}(z)$) of the second adaptive filter unit 208B may be dependent on a noise path and a speech path. The noise path may correspond to a path of reception of the one or more noise signals from at least one of the first speech transducer 202A and the second speech transducer 202B. Similarly, the speech path may correspond to a path of reception of the speech signal from the at least one of the first speech transducer 202A and the second speech transducer 202B.

Further, the second adaptive filter unit 208B may be configured to determine a noise path impulse response corresponding to the noise path and a speech path impulse response corresponding to the speech path. The noise path impulse response may be described by a ratio of the fourth acoustic impulse response ($A_{22}(z)$) to the third acoustic impulse response ($A_{12}(z)$). Similarly, the speech path impulse response may be described by a ratio of the second acoustic impulse response ($A_{21}(z)$) to the first acoustic impulse response ($A_{11}(z)$). The desired response ($H_{CSO}(z)$) of the second adaptive filter unit 208B may be inversely proportional to a difference in the speech path impulse response and the noise path impulse response. The desired response ($H_{CSO}(z)$) may be represented by the following equation (6):

$$H_{CSO}(z) = \frac{1}{\frac{A_{21}(z)}{A_{11}(z)} - \frac{A_{22}(z)}{A_{12}(z)}} \quad (6)$$

To obtain the desired response ($H_{CSO}(z)$), the second adaptive filter unit 208B may be adapted to filter the speech signal. The second adaptive filter unit 208B may be adapted on the basis of reception of the speech signal from the speech path of the first speech transducer 202A. In other words, the second adaptive filter unit 208B may be adapted only when the speech signal is present in the first signal (X(z)) received from the first speech transducer 202A. Based on the desired response $H_{CSO}(z)$, the second adaptive filter unit 208B generates an amplified version of the speech signal, received via the first speech transducer 202A, without a change in a component of noise in the first signal (X(z)).

The adaptation of the second adaptive filter unit 208B and corresponding operation is described below. The second adaptive filter unit 208B may be adapted on the basis of one or more steps, such as a determination of formant frequencies in the speech signal, identification of the frequency bins near the formant frequencies, and estimation of adapted step-sizes at each formant frequency. The adapted step-sizes may be associated with a determination of a number of iterations to be performed by the second adaptive filter unit 208B on a received input. The second adaptive filter unit 208B may determine, via the processor 204, each formant in a set of formants in the speech signal in the received first signal (X(z)). Each formant corresponds to a resonant frequency bin in the speech signal. In general, a formant is an acoustic resonance of the vocal tract of a person and a spectral maximum of acoustic energy around a specific frequency. The formant may be interchangeably referred to as a formant frequency. The speech signal around each formant is significant and dominant over a component of noise. Therefore, formant-aided adaption is preferred for the second adaptive filter unit 208B. A defined number of frequency bins of a defined window size, adjacent to each determined formant in the set of formants, may be determined by the second adaptive filter unit 208B, in conjunction with the processor 204. The defined number of frequency bins may be determined in a specified pattern for adaptation to the speech signal in the received first signal (X(z)).

In accordance with an exemplary embodiment, the specific pattern may comprise a selection of a pair of three frequency bins from each symmetrical side of the determined formant and the defined window size, such as "7". The second adaptive filter unit 208B may estimate an adapted step-size corresponding to each determined formant and each frequency bin of the identified defined number of frequency bins in the speech signal of the first signal (X(z)). The adapted step-size may be estimated to optimize at least one of a convergence speed, a steady state error, and a stability of the second adaptive filter unit 208B for filtration of the speech signal from the received first signal (X(z)). The speech signal may be filtered based on the estimated step-size.

The second adaptive filter unit 208B may be further evaluated and configured by the processor 204 based on a design algorithm to obtain a minimal difference in the desired filter output and the obtained filter output. Examples of the design algorithm may include, but are not limited to, Least Mean Square (LMS), Recursive Least Squares (RLS), filtered-x LMS, or normalized least-mean-square (NLMS) algorithm. In accordance with an embodiment, the second adaptive filter unit 208B is configured as a sparseness controlled multiline delay filter (SC-IPMDF) or an MDF for determination of each formant and corresponding frequency bins in the speech signal of the first signal. The MDF is known to one skilled in the art and therefore, the operation of the MDF has not been described herein for the sake of brevity. Further, the second adaptive filter unit 208B may track impulse responses corresponding to speech or noise in either of the speech path and the noise path.

With reference to the first exemplary embodiment, the first signal (X(z)) may comprise the one or more noise signals and the second signal (Y(z)) may comprise the one or more noise signals. In such a case, the optimum impulse response ($H_{CSO}(z)$) may be simplified to a negative of a ratio of the third acoustic impulse response ($A_{12}(z)$) and the fourth acoustic impulse response ($A_{22}(z)$). The optimum impulse response (($H_{CSO}(z)$) may be represented by the following equation (7):

$$H_{CSO} = -\frac{A_{12}(z)}{A_{22}(z)} \tag{7}$$

Therefore, the second adaptive filter unit 208B may cancel the one or more noise signals in the first signal (X(z)) on the basis of a correlation of a residual noise signal from the second adaptive filter unit 208B with the one or more noise signals in the first signal (X(z)). The residual noise signal may correspond to a component of noise in the processed signal ($X_{ES}(z)$).

With reference to the second exemplary embodiment, the first signal (X(z)) and the second signal (X(z)) may comprise the speech signal. In such a case, the optimum response $H_{CSO}(z)$ may be simplified to a ratio of the first acoustic impulse response ($A_{11}(z)$) and second acoustic impulse response ($A_{21}(z)$). The optimum impulse response ($H_{CSO}(z)$) may be represented by the following equation (8):

$$H_{CSO}(z) = \frac{A_{11}(z)}{A_{21}(z)} \tag{8}$$

Therefore, the second adaptive filter unit 208B may generate an output $B_2(z)$ with a response equivalent to a response of an inverse speech remover. The output $B_2(z)$ may be represented by the following equation (9):

$$B_2(z) = A_{11}(z) \times S(z) \tag{9}$$

With reference to the third exemplary embodiment, the first signal (X(z)) may comprise the speech signal and the one or more noise signals and the second signal (Y(z)) may comprise the one or more noise signals. In such a case, the second acoustic impulse response $A_{21}(z)$ may be zero (i.e., $A_{21}(z)=0$) and the first adaptive filter unit 208A may provide the filtered second signal with the reverberation signal only. The optimum response $H_{CSO}(z)$ may be exclusively dependent on the noise path and may be simplified to a negative of a ratio of the third acoustic impulse response ($A_{12}(z)$) and the fourth acoustic impulse response ($A_{22}(z)$). The optimum impulse response ($H_{CSO}(z)$) may be represented by the following equation (10) and (11):

$$H_{CSO}(z) = -\frac{A_{12}(z)}{A_{22}(z)} \tag{10}$$

$$H_{CSO}(z) = -\frac{1}{H_{NO}(z)} \tag{11}$$

Therefore, the estimation ($B_2(z)$) of the second adaptive filter unit 208B may exactly capture the speech signal received via the first speech transducer 202A. The estimation $B_2(z)$ may be represented by the following equation (12):

$$B_2(z) = Y_S(z) \times H_{CSO}(z) = A_{11}(z) \times S(z) \tag{12}$$

With reference to the fourth exemplary embodiment, the first signal (X(z)) may comprise the one or more noise signals and the second signal (Y(z)) may comprise the speech signal and the one or more noise signals. In such a case, the first adaptive filter unit 208A may remove the one or more noise signals from the received second signal (Y(z)). The component of speech in the second signal (Y(z)) may leak into the processed signal ($X_{ES}(z)$) from the second adaptive filter unit 208B. The leakage may be dependent on an initial value of the impulse response ($H_{CS}(z)$) of the second adaptive filter unit 208B. The impulse response ($H_{CS}(z)$) may be initialized with a specified value, for example "1". Additionally, the second adaptive filter unit 208B may be operated in the non-adaptive mode and therefore, the initialized value, for example "1", remains unchanged. The output, i.e., the processed signal ($X_{ES}(z)$), of the first pre-processor 208 may provide a correlated noise and a speech amplified output irrespective of the reception channel of the speech signal or the one or more noise signals.

The first pre-processor 208 may be configured to transmit the processed signal ($X_{ES}(z)$), as a first input, to the second pre-processor 210 (FIG. 2D). The second pre-processor 210 may further receive the second signal (Y(z)), a second input, from the second speech transducer 202B. In accordance with an embodiment, the second pre-processor 210 may be a speech remover which may be configured to process (or cancel) the speech signal from the received second signal (Y(z)) to obtain a reference noise signal ($Y_N(z)$) (FIG. 2D) for the post-processor 212. In other words, the second pre-processor 210 reduces the SNR of the received second signal (Y(z)) to obtain the reference noise signal ($Y_N(z)$).

In accordance with an embodiment, the second pre-processor 210 may further comprise the first filter 210A and the second filter 210B. The first filter 210A may be configured to filter the component of noise in the processed signal ($X_{ES}(z)$) to obtain a filtered first signal ($X_E(z)$). The component of noise may be filtered to provide the speech signal, modeled as the speech signal in the received second signal (Y(z)), to the second filter 210B. For example, the first filter 210A may be a single channel speech enhancer based on a defined filter, such as the Weiner filter. The Weiner filter may compute a statistical estimate of the speech signal from a noisy speech signal as an input and filter the noisy speech signal to produce an estimate of speech signal. Further, the second filter 210B may be configured to estimate the speech signal from the received second signal (Y(z)) and filter (or cancel) the estimated the speech signal from the received second signal (Y(z)) to obtain the reference noise signal ($Y_N(z)$). The second pre-processor 210 may communicate the filtered first signal ($X_E(z)$), as a reference signal for the speech signal, to the second filter 210B.

In addition to the received filtered first signal ($X_E(z)$), the second filter 210B may further receive the second signal (Y(z)) for removal of the estimated the speech signal from the second signal (Y(z)). In accordance with an embodiment, the second filter 210B may be an adaptive filter with an output represented by ($Y_N(z)$), a first input as the received second signal (Y(z)), a second input as the processed signal ($X_{ES}(z)$), and an impulse response of $H_S(z)$. Therefore, the output $Y_N(z)$ may be represented by the following equation (13):

$$Y_N(z)=Y(z)-X_E(z) \times H_S(z) \quad (13)$$

The second filter 210B may be further configured for an optimum impulse response ($H_{SO}(z)$). The optimum impulse response ($H_{SO}(z)$) of the second filter 210B may be determined based on a first condition and a second condition.

In accordance with the first condition, the second pre-processor 210 may be assumed to provide the filtered first signal ($X_E(z)$) that is modeled as a clear reference speech signal. The first condition may be represented by the following equation (14):

$$X_E(z)=A_{11}(z) \times S(z) \quad (14)$$

In accordance with the second condition, the second pre-processor 210 may be assumed to completely filter the speech signal from the received second signal (Y(z)) without any distortion in noise characteristics, such as noise power, noise margin or noise spectral density. The second condition may be represented by the following equation (15):

$$Y_N(z)=A_{22}(z) \times V(z) \quad (15)$$

The optimum impulse response ($H_{SO}(z)$) of the second pre-processor 210 may be described as a ratio of the second acoustic impulse response ($A_{21}(z)$) and the first acoustic impulse response ($A_{11}(z)$). Therefore, the optimum impulse response ($H_{SO}(z)$) of the second pre-processor 210 may be dependent specifically on the speech path. The optimum impulse response ($H_{SO}(z)$) of the second pre-processor 210 may be represented by the following equation:

$$H_{SO}(z) = \frac{A_{21}(z)}{A_{11}(z)} \quad (16)$$

The second filter 210B may be further configured to adapt for the presence of the speech signal in both of the received first signal (X(z)) and the received second signal (Y(z)). The adaptation of the second filter 210B may be similar to the adaption of the second adaptive filter unit 208B. The primary need for adaptation of the second filter 210B is to render the optimum impulse response ($H_{SO}(z)$) with complete filtration of the speech signal from the received second signal even when the speech signal is present in the first signal (X(z)) and the second signal (Y(z)). Additionally, the adaptation may be performed to optimize at least a number of iterations, a step-size, an error rate, and a convergence rate of the second filter 210B. The second filter 210B may be adapted for a speech estimation error for each iteration of the second filter 210B. For example, in a first iteration, the second filter 210B may generate an error signal which may be represented by a first speech estimation error ($E_1$). The first speech estimation error ($E_1$) may be used to update a set of filter coefficients of the second filter 210B. The set of filter coefficients may be updated until the optimum response ($H_{SO}(z)$) of the second filter 210B is obtained. The speech estimation error may arise due to incoherence in the filtered first signal ($X_E(z)$) (as modeled speech signal) and the speech signal in the received second signal (Y(z)). The first speech estimation error ($E_1$) may be affected by a component of noise which may be captured by the second speech transducer 202B. Therefore, formant-aided adaptation may be preferred for the second filter 210B to circumvent effects of noise and phase errors in the first speech estimation error ($E_1$).

The second filter 210B may be configured to determine each formant of the set of formants in the speech signal. The speech signal, for formant determination, may be received from the second speech transducer 202B. Formant frequencies may be selected for the determination of the speech estimation error as the effect of noise on the speech estimation error may be minimal at formant frequencies. Additionally, a phase of the speech estimation error may remain unchanged at formant frequencies. A step-size and a set of coefficients may be estimated for the second filter 210B with each iteration of a set of iterations, by the processor 204. The step-size and the set of coefficients may be utilized to adapt the second filter 210B with the speech estimation error. With a first iteration, the set of coefficients may be initialized with a zero value which may be based on absence of the speech signal in the speech path of the second speech transducer 202B. Additionally, the step-size may be initialized with a minimal value to compensate for a noise floor in the one or more noise signals. The initialized step-size and set of coefficients for the second filter 210B may be updated with the estimated step-size and the estimated set of coefficients. The estimation of the step-size and the set of coefficients may be performed until a minimization criterion for the second filter 210B is satisfied. The minimization criterion may be associated with an optimization algorithm. Examples of the optimization algorithm may include, but are not limited to, LMS, NLMS, RLS, and LLMS algorithm. The optimization algorithms (as mentioned above) are known to one skilled in the art and further description is avoided for the sake of brevity. The second filter 210B in the second pre-processor 210 may be configured to communicate the reference noise signal $(Y_N(z))$ to the post-processor 212.

In addition to the reference noise signal $(Y_N(z))$, the post-processor 212 may be further configured to receive the processed signal $(X_{ES}(z))$ from the first pre-processor 208. In accordance with an embodiment, the post-processor 212 may be an ANC which may be adapted for cancellation or filtration of the component of noise from the processed signal $(X_{ES}(z))$ based on the reference noise signal $(Y_N(z))$. The post-processor 212 may determine the processed speech signal $(S_E(z))$ (FIG. 2B) after adaptive cancellation of the component of noise. The processed speech signal $(S_E(z))$ may be characterized as directional, amplified, or enhanced speech signal with significant clarity and intelligibility as compared to unprocessed speech signals or noisy speech signals. Additionally, the post-processor 212 may generate additional noise component due an interference of the one or more noise signals from the noise path. However, the additional noise component may be assumed to have a negligible effect on the processed speech signal $(S_E(z))$. The speech signal from the determined speech source is detected agnostic of a presence of at least one of the speech signal and the one or more noise signals from the first speech transducer 202A and the second speech transducer 202B.

In accordance with an embodiment, the disclosed system and apparatus may utilize acoustic impulse responses from known recommendations, which may include, but may not be limited to, ITU-T P.340, ITU-T G.167 and ITU-T G.168, for performance measurement. Various test parameters may be measured for the overall performance measurement. Such test parameters may include, but are not limited to, a segmental signal to noise ratio (SegSNR), a noise reduction (NR) score, an Itakura Saito Distance (ISD), and a mean opinion score (MOS).

In accordance with an embodiment, the SegSNR is evaluated for each frame of a noisy speech signal, such as the first signal (X(z)) or the second signal (Y(z)), and subsequent frame of the processed speech signal $(S_E(z))$. The SegSNR is finally evaluated for the entire processed speech signal from an average of SegSNR for each frame of the noisy speech signal and the processed speech signal. In accordance with an exemplary scenario, (X(i)) and (S(i)) may represent a frame (i) of the noisy speech signal, such as the first signal and the processed speech signal, (N) and (M) may be a total number of frames and a length of each frame, for example "20 milliseconds". The SegSNR (dB) may be represented by the following equation (17):

$$SegSNR(\text{dB}) = \sum_{M=0}^{M-1} \log_{10} \sum_{i=NM}^{NM+N-1} \left( \frac{\sum_{i=1}^{N} X(i)^2}{\sum_{i=1}^{N} (X(i) - S(i))^2} \right) \quad (17)$$

In accordance with an embodiment, the NR score may be a score evaluated for a reduction in noise from the noisy speech signal to the processed speech signal. Similarly, the ISD may provide a measure of a difference in a spectrum of the noisy speech signal and the processed speech signal. The MOS may provide a subjective measurement of a quality and intelligibility of speech signals.

In a first example, for an input SNR of "5 dB" for the noisy speech signal, such as the first signal (X(z)) or the second signal (Y(z)), the ISD, SegSNR, NR, and MOS may be approximated to "1.43", "6.13 dB", "25 dB", and "3.9", respectively. In a second example, for an input SNR of "10 dB" for the noisy speech signal, such as the first signal (X(z)) or the second signal (Y(z)), the ISD, SegSNR, NR, and MOS may be approximated to "1.1", "7.20 dB", "20 dB", and "4.2", respectively. In a third example, for an input SNR of "−3 dB" for the noisy speech signal, such as the first signal (X(z)) or the second signal (Y(z)), the ISD, SegSNR, NR and MOS may be approximated to "1.98", "3.13 dB", "31 dB", and "3.52", respectively.

Referring to above examples, in accordance with the disclosed system and apparatus, the MOS for a low input SNR (for example "−3 dB") is significantly comparable to the MOS for a better input SNR (for example "10 dB") and corresponding difference in the MOS ("4.20-3.52") is negligible, i.e., "0.68". Similarly, the NR for the low input SNR (for example "−3 dB") is significantly comparable to the NR for a better input SNR (for example "5 dB") and a corresponding difference in NR ("31 dB-25 dB") is negligible, i.e., "6 dB". It may be noted that the above instances are merely for exemplary purposes and should not be construed as limiting. The actual results may be different from above results, without deviation from the scope of the disclosure.

It may be noted that, as described above, the first pre-processor 208, the second pre-processor 210, and the post-processor 212 sequentially processes the first signal and the second signal to obtain the enhanced speech signal of significantly high SNR, clarity, and quality. However, the first pre-processor 208, the second pre-processor 210, and the post-processor 212 may process (or filter) signals (or electrical noises) in the at least one silence region within the first signal or the second signal, without adaptation of the adaptive filters in the first pre-processor 208, the second pre-processor 210, and the post-processor 212, without deviation from the scope of the disclosure.

Figure 3A:
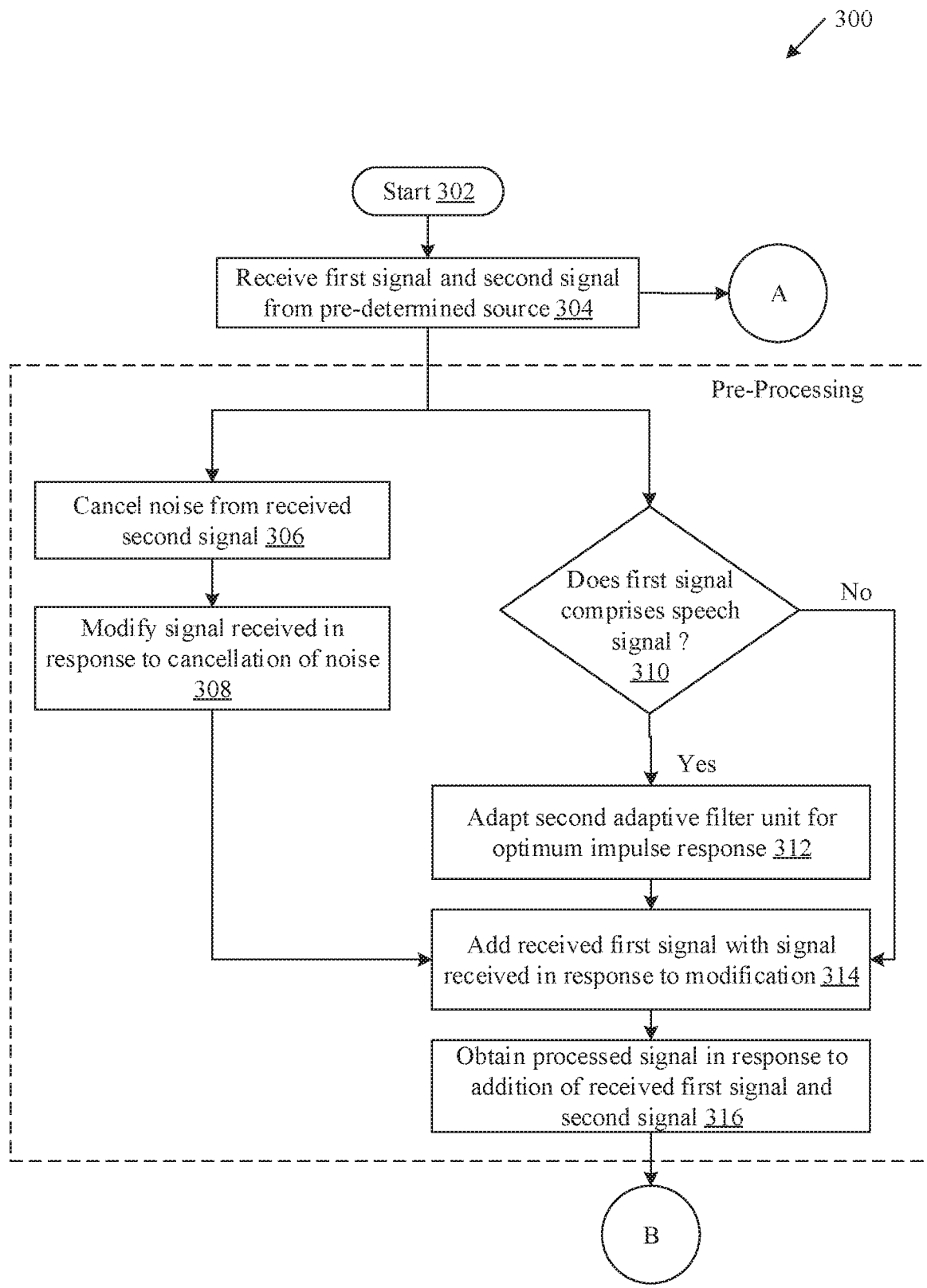
FIG. 3A, FIG. 3B, and FIG. 3C are flow charts that collectively illustrate exemplary operations for an adaptive enhancement of speech signal by the signal processing apparatus of FIGS. 2A to 2D, in accordance with various exemplary embodiments of the disclosure.
Figure 3B:
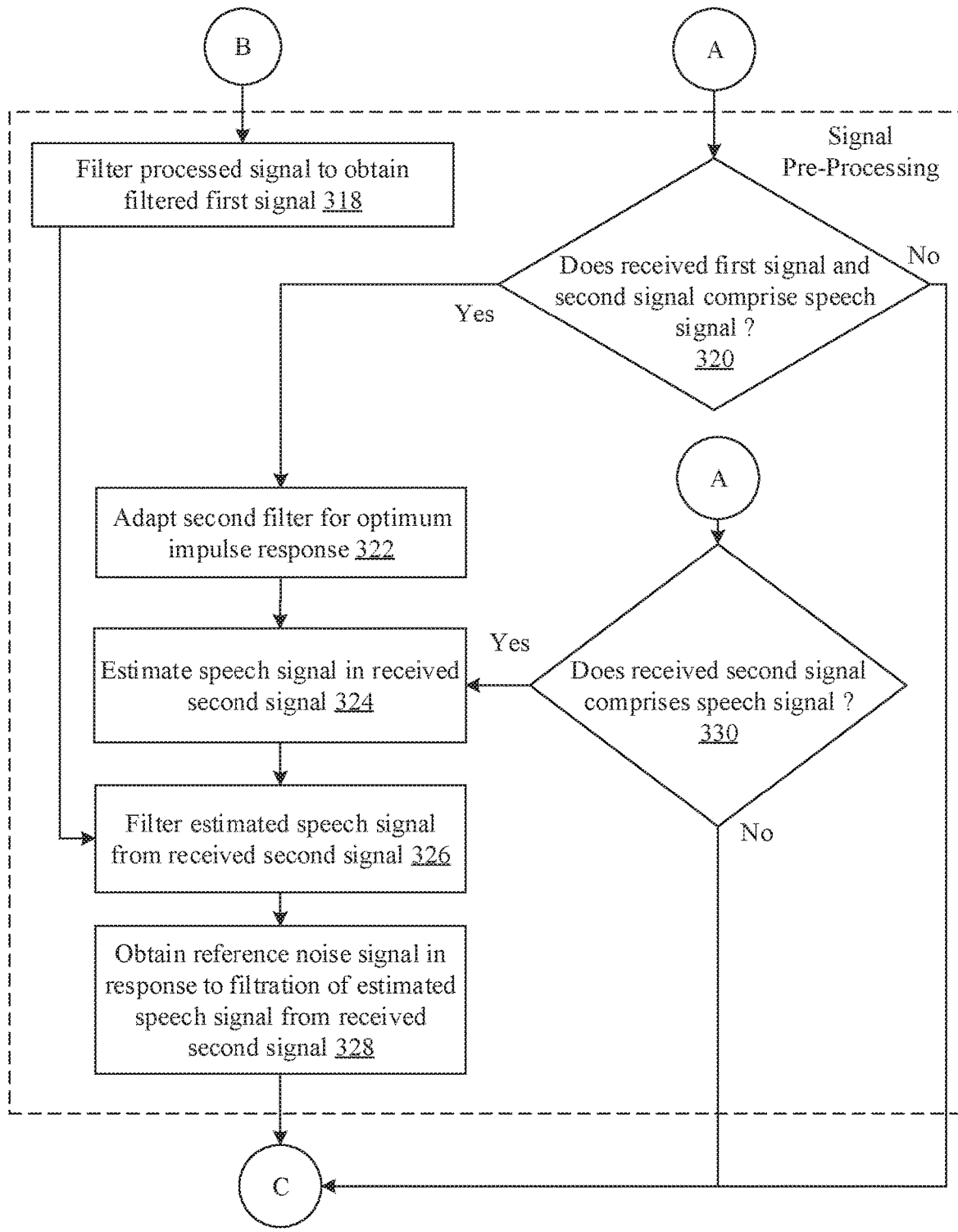
Figure 3C:
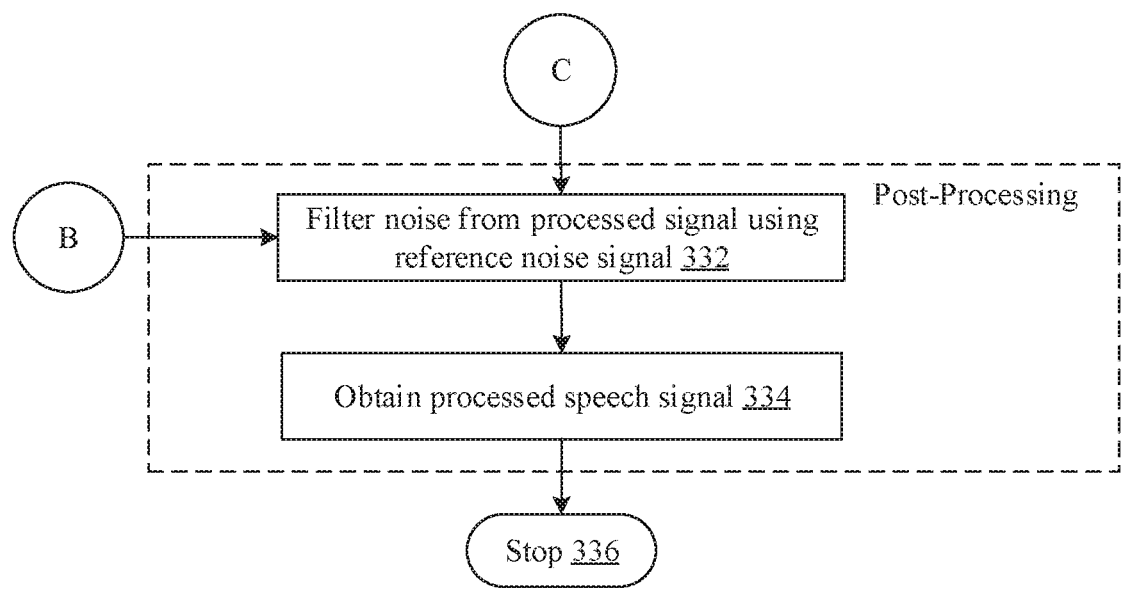

FIG. 3A, FIG. 3B, and FIG. 3C are flowcharts that collectively illustrate exemplary operations for an adaptive enhancement of speech signal, in accordance with various exemplary embodiments of the disclosure. FIGS. 3A, 3B, and 3C may be described in conjunction with FIG. 2A, FIG. 2B, FIG. 2C, and FIG. 2D. In FIGS. 3A, 3B and 3C, there is shown a flow chart 300 comprising exemplary operations from 302 through 336. The exemplary operations for the adaptive enhancement of the speech signal may start at 302 and proceed to 304.

At 304, a first signal, such as the first signal (X(z)), and a second signal, such as the second signal (Y(z)), may be received from a determined source. In accordance with an embodiment, the first speech transducer 202A and the second speech transducer 202B may be configured to receive the first signal (X(z)) and the second signal (Y(z)), respectively. Alternatively, one or more network ports of the I/O unit 202 may be configured to receive the first signal (X(z)) and the second signal (Y(z)) as media files, via the communication network 112 or from a persistent storage device. The received first signal (X(z)) may comprise at least one of the speech signal or one or more noise signals. Similarly, the received second signal (Y(z)) may comprise at least one of the speech signal or the one or more noise signals. The determined source, for the first signal (X(z)) and the second signal (Y(z)), may comprise a defined speech source or at least one noise source.

In accordance with an embodiment, a user positioned in the vicinity of the first channel 104 may be the defined speech source. Alternatively, a group of one or more users in a collaborative communication environment may be the speech source. In such cases, the speech source may be a multiplexed, digitized, and packetized output from each microphone present at each user end in the conference call. Further, the at least one noise source may be characterized to generate the one or more noise signals in a frequency band which may be greater or lesser than a bandwidth of the speech signal. Additionally, the frequency band of the one or more noise signals may be present in the bandwidth of the speech signal. The at least one noise source may be a deterministic or indeterminate signal. In accordance with an embodiment, a crosstalk may be a deterministic noise signal in the first signal (X(z)) or the second signal (Y(z)). Control proceeds to 306, 310, 320, and 330 concurrently.

At 306, the one or more noise signals may be cancelled from the received second signal (Y(z)). In accordance with an embodiment, the first adaptive filter unit 208A may be configured to filter the one or more noise signals from the received second signal (Y(z)). The operation of filtration (or cancellation) may be enabled by a set of instructions, executed by the processor 204, in the memory 206. In general, the first adaptive filter unit 208A may be a linear digital filter with a transfer function that may be controlled via one or more variable parameters. The one or more variable parameters may be evaluated via numerous statistical or regression techniques in accordance with dynamic variation the speech signal and the one or more noise signals. The first adaptive filter unit 208A may receive the second signal (Y(z)) from the second speech transducer 202B (as described in FIG. 2A). Alternatively, the first adaptive filter unit 208A may receive the second signal (Y(z)) from a file in a persistent storage of the signal processing apparatus 102, a cloud, or a network source which hosts the second signal (Y(z)) as a file.

In accordance with an embodiment, the first adaptive filter unit 208A initially estimates a component of noise corresponding to the one or more noise signals in the second signal (Y(z)). The estimation may be based on a received input of the first signal (X(z)) to the first adaptive filter unit 208A.

The estimated component of noise is filtered (or cancelled) from the second signal (Y(z)). The filtration of the estimated component of noise from the second signal (Y(z)) is performed to obtain the speech signal from the received second signal (Y(z)) from the second speech transducer 202B. The filtered second signal ($Y_S(z)$) is obtained after filtration by the first adaptive filter unit 208A. The filtered second signal ($Y_S(z)$) comprises the speech signal. Alternatively, an optimum impulse response may be obtained for the first adaptive filter unit 208A. The first adaptive filter unit 208A may be adapted when the first signal (X(z)) and the second signal (Y(z)) include the one or more noise signals. In such cases, the one or more noise signals may correspond to a diffused noise field and the speech signal may require suitable estimation of step-size and filter coefficients which may further enable filtration of the component of noise from the second signal (Y(z)). The first adaptive filter unit 208A may obtain the speech signal and a reverberated speech component in the filtered second signal ($Y_S(z)$), for the optimum impulse response of the first adaptive filter unit 208A.

At 308, a modification of the filtered second signal ($Y_S(z)$) may be performed after noise cancellation at 306. In accordance with an embodiment, the second adaptive filter unit 208B may be configured to obtain a single speech signal based on modification of the at least one of the speech signal and the reverberated speech signal in the filtered second signal ($Y_S(z)$).

The single speech signal may be associated with a phase and a gain that match with corresponding phase and gain of the speech signal in the received first signal (X(z)). The phase difference and attenuation of the reverberated speech signal is modified to obtain a compensated speech signal whose gain and phase are approximately equal to the speech signal in the first signal (X(z)). The modification of the reverberated speech signal may correspond to a compensation or correction technique and may be performed by the second adaptive filter unit 208B. The compensated speech signal and the speech signal in the filtered second signal ($Y_S(z)$) may be collectively referred to as the single speech signal.

At 310, it is determined whether the speech signal is present in the received first signal (X(z)). In accordance with an embodiment, the processor 204 may be configured to perform a check for presence of the speech signal in the received first signal (X(z)). The condition may be evaluated to positively or negative validate adaptation of the second adaptive filter unit 208B. In an instance when the speech signal is present in the first signal (X(z)), control passes to 312. In another instance when the speech signal is absent in the first signal (X(z)), control passes to 314.

At 312, an adaptation of the second adaptive filter unit 208B is performed. In accordance with an embodiment, the processor 204, in conjunction with the first pre-processor 208, may be configured to adapt the second adaptive filter unit 208B. The second adaptive filter unit 208B may be adapted to obtain the desired response (impulse) for the first signal (X(z)) or the second signal (Y(z)). The second adaptive filter unit 208B may be adapted to the speech signal based on reception of the speech signal from the speech path corresponding to the first speech transducer 202A. In other words, the second adaptive filter unit 208B is adapted only when the speech signal is present in the first signal (X(z)) from the first speech transducer 202A.

The second adaptive filter unit 208B may be adapted based on one or more steps, such as a determination of formant frequencies in the speech signal, identification of the frequency bins near the formant frequencies and estimation of adapted step-sizes at each formant frequency (as discussed in description of FIGS. 2A to 2D). The SC-IPMDF technique may be implemented for determination of each formant and corresponding frequency bins in the speech signal of the received first signal (X(z)). The description of such technique is not discussed as it is known to one ordinarily skilled in the art.

At 314, an addition of the received first signal (X(z)) and the single speech signal is performed. In accordance with an embodiment, the second adaptive filter unit 208B, in conjunction with the processor 204, may perform the addition of the received first signal and the single speech signal. The single speech signal is constructively summed up with the received first signal (X(z)) to obtain the processed signal ($X_{ES}$(z)). The second adaptive filter unit 208B may be primarily configured to generate an amplified version of the speech signal, received via the first speech transducer 202A, without a change in a component of noise in the first signal (as discussed in description of FIGS. 2A to 2D).

At 316, a processed signal, such as the processed signal ($X_{ES}$(z)), is obtained from the received first signal (X(z)) and the received second signal (Y(z)). In accordance with an embodiment, the first pre-processor 208, comprising the first adaptive filter unit 208A and the second adaptive filter unit 208B, may be configured to obtain the processed signal ($X_{ES}$(z)) from the received first signal (X(z)) and the received second signal (Y(z)). The second adaptive filter unit 208B may obtain the processed signal ($X_{ES}$(z)) based on the constructive combination of the obtained single speech signal and the received first signal. The speech signal in the processed signal ($X_{ES}$(z)), obtained from the second adaptive filter unit 208B, may be associated with a gain amplified by the determined factor, such as "2". The processed signal ($X_{ES}$(z)) may be a directional, speech enhanced, and noise minimalized speech signal and may be characterized by amplification in the gain associated with the speech signal.

At 318, a filtration of the processed signal ($X_{ES}$(z)) is performed to obtain a filtered first signal ($X_{E}$(z)). In accordance with an embodiment, the first filter 210A, in the second pre-processor 210, may be configured to filter the processed signal ($X_{ES}$(z)) to obtain the filtered first signal ($X_{E}$(z)). The first filter 210A may filter the component of noise in the processed signal ($X_{ES}$(z)). A primary objective to obtain the filtered first signal ($X_{E}$(z)) from the first filter 210A is to precisely model the speech signal in the received second signal (Y(z)). In other words, the speech signal is significantly redundant in compression of signals as compared to the one or more noise signals. Further, a correlation of the speech signal in the first signal (X(z)) and the second signal (Y(z)) pre-dominates a correlation of the component of noise in the first signal (X(z)) and the second signal (Y(z)). Therefore, a short adaptive filter, for example, the Weiner filter, may be used as the first filter 210A to obtain the filtered first signal ($X_{E}$(z)) as the modeled speech signal for the component of the speech in the second signal (Y(z)). The filtered first signal ($X_{E}$(z)) from the first filter 210A may be communicated as a first input to the second filter 2108.

At 320, it is determined whether the speech signal is present in the received first signal (X(z)) and the received second signal (Y(z)). In accordance with an embodiment, the processor 204 may be configured to perform a check for presence of the speech signal in the received first signal (X(z)) and the received second signal (Y(z)). The condition may be evaluated to positively or negatively validate adaptation of the second filter 210B of the second pre-processor 210. In an instance when the speech signal is present in the received first signal (X(z)) and the received second signal (Y(z)), control passes to 322. In another instance, when the speech signal is absent in the received first signal (X(z)) and present in the received second signal (Y(z)), the speech signal is present in the received first signal (X(z)) and absent in the received second signal (Y(z)), or the speech signal is absent in both the received first signal (X(z)) and the received second signal (Y(z)), control passes to 332.

At 322, an adaptation of the second filter 210B may be performed. In accordance with an embodiment, the processor 204, in conjunction with the second pre-processor 210, may be configured to adapt the second filter 2108. The adaptation of the second filter 210B may be similar to the adaption of the second adaptive filter unit 208B. The second filter 210B of the second pre-processor 210 may be adapted for a speech estimation error in an iteration of a set of iterations of the second filter 210B (as discussed in FIGS. 2A to 2D). The step-size and the set of coefficients may be utilized to adapt the second filter 210B with the speech estimation error. The estimation of the step-size and the set of coefficients may be performed until the minimization criterion for the second filter 210B may be satisfied. Additionally, the minimization criterion may be associated with an optimization algorithm. Examples of the optimization algorithm may include, but are not limited to, LMS, NLMS, RLS, and LLMS algorithm.

At 324, an estimation of a speech signal in the received second signal (Y(z)) is performed. In accordance with an embodiment, the second filter 210B is configured to estimate the speech signal (Y(z)) from the received second signal (Y(z)). The estimation of the speech signal may be performed by at least one of statistical or regression techniques. Additionally, audio fingerprints may be utilized for estimation of the speech signal in the received second signal (Y(z)). The filtered first signal ($X_{E}$(z)) may be used as a model speech signal for estimation of the speech signal in the received second signal (Y(z)) (as discussed in description of FIGS. 2A to 2D).

At 326, a filtration of the estimated speech signal from the received second signal (Y(z)) is performed. In accordance with an embodiment, the second filter 2108 may be further configured to receive the filtered first ($X_{E}$(z)) signal from the first filter 210A as a reference signal for the speech signal for removal of the estimated the speech signal from the received second signal. The second filter 210B may be an adaptive filter with an optimum impulse response. The optimum impulse response of the second filter 210B may be determined based on a first condition and a second condition (as described in FIGS. 2A to 2D).

At 328, a reference noise signal, such as the reference noise signal ($Y_{N}$(z)), may be obtained from the received second signal (Y(z)). In accordance with an embodiment, the signal post-processor, comprising the first filter 210A and the second filter 210B, may obtain the reference noise signal ($Y_{N}$(z)) from the received second signal (Y(z)). The reference noise signal ($Y_{N}$(z)) may be obtained by cancellation of the speech signal from the received second signal (Y(z)). The cancellation of the speech signal may be associated with a subtraction operation on the processed signal ($X_{ES}$(z)) from the first pre-processor 208 and the second signal (Y(z)) from the second speech transducer 202B, respectively. The first pre-processor 208 primarily models the noise component (as the one or more noise signals) in the ambient environment. The modeled noise component may be used for adaptive cancellation of the one or more noise signals present with the speech signal.

At 330, it is determined whether the speech signal is present in the received second signal (Y(z)). In accordance with an embodiment, the processor 204 may be configured to perform a check for presence of the speech signal in the received second signal (Y(z)). The condition may be evaluated to positively or negatively validate adaptation of the second filter 210B of the second pre-processor 210. In an instance when the speech signal is present in the received second signal (Y(z)), control passes to 324. In another instance, when the speech signal is absent in the received second signal (Y(z)), control passes to 332.

At 332, noise may be filtered from the processed signal ($X_{ES}(z)$) with respect to the reference noise signal ($Y_N(z)$). In accordance with an embodiment, the post-processor 212 may be configured to filter the reference noise signal ($Y_N(z)$) from the processed signal ($X_{ES}(z)$). In other words, the reference noise signal ($Y_N(z)$) may be subtracted from the processed signal ($X_{ES}(z)$). The signal post-processor may be an adaptive noise canceller which may be adapted for cancellation or filtration of the component of noise from the processed signal ($X_{ES}(z)$) based on the reference noise signal ($Y_N(z)$). The post-processor 212 may adaptively cancel the component of noise from the processed signal ($X_{ES}(z)$) (as discussed in FIGS. 2A to 2D).

At 334, a processed speech signal, such as the processed speech signal ($S_E(z)$), may be obtained after the adaptive noise cancellation of the processed signal ($X_{ES}(z)$). In accordance with an embodiment, the post-processor 212 may be configured to obtain the processed speech signal ($S_E(z)$) based on filtration of the obtained reference noise signal from the processed signal ($X_{ES}(z)$). The processed speech signal ($S_E(z)$) may be characterized as directional, amplified, or enhanced with clarity and intelligibility. Additionally, the post-processor 212 may generate additional noise component due an interference of the one or more noise signals from the noise path. The additional noise component may be assumed to have a negligible effect on the processed speech signal ($S_E(z)$). Control ends at 336.

The present disclosure may provide several advantages over the traditional speech enhancement solutions. The first pre-processor 208 of the signal processing apparatus 102 may implement beamforming in the pre-processing stage to provide additional gain and phase alignment which further facilitates adaptive filtering of noise from noisy speech signals. The formant aided adaptation of the second adaptive filter unit 208B or the second filter 210B further provides a filtered output which is significantly dependent on the speech path. Therefore, the output of the post-processor 212 is only dependent on the speech path and comprises most of the enhanced speech signal, whereas the traditional speech enhancement solutions provide enhanced speech output with additional noise component and where the output is significantly dependent on the speech path as well as the noise path. The leakage of speech signal, in the post-processor 212, is suppressed as the impulse response is entirely dependent on the speech path of speech signal. The post-processor 212 provides the processed speech signal with a negligible additional noise component as compared to a significant noise component in traditional speech enhancement solutions where noisy speech signal is directly provided to adaptive noise cancellers.

The signal processing apparatus 102 may enhance the speech signal agnostically and robustly for every case of presence or absence of speech and noise signals in corresponding first channel 104 or the second channel 106. The gain of the speech signal is improved and that of noise signal is degraded at each stage of the first adaptive filter unit 208A and the second adaptive filter unit 208B and therefore, the SNR of the received signals remains high. The processed speech signal is characterized by an optimum quality and intelligible output and shows better performance in terms of a segmental SNR (SegSNR), an Inter Saito Distance (ISD), and a Mean Opinion Score (MOS), with respect to the ones provided by the traditional speech enhancement solutions.

Various embodiments of the disclosure may provide a non-transitory computer-readable medium having stored thereon, computer implemented instructions that when executed by the processor 204 causes the speech enhancement system to execute operations to perform adaptive enhancement of the speech signal. The speech enhancement system may comprise the signal processing apparatus 102, comprising the first pre-processor 208, the second pre-processor 210, and the post-processor 212, and the first channel 104 and the second channel 106 for reception of the first signal and the second signal, respectively. The speech enhancement system may execute operations comprising receiving a first signal and a second signal from a determined source, obtaining a processed signal from the received first signal and the second signal, obtaining a reference noise signal from the received second signal, and determining a processed speech signal from filtration of the reference noise signal from the processed signal. The first channel 104 and the second channel 106 may receive the first signal and the second signal from the determined source. The first signal comprises at least one of the speech signal or the one or more noise signals, and the second signal comprises at least one of the speech signal or the one or more noise signals. The first pre-processor 208 may obtain the processed signal based on the received first signal and the received second signal for amplification of a gain associated with the speech signal present in the received first signal and the second signal. An SNR associated with the processed signal may be greater than or equal to a threshold value. The second pre-processor 210 may obtain the reference noise signal from the received second signal based on subtraction of an estimated speech signal present in the received second signal from the processed signal. The post-processor 212 may determine the processed speech signal based on filtration of the obtained reference noise signal from the obtained processed signal.

Various embodiments of the disclosure comprise a speech enhancement system that may be configured to perform adaptive enhancement of the speech signal. The speech enhancement system may comprise the signal processing apparatus 102, comprising the first pre-processor 208, the second pre-processor 210, and the post-processor 212, and the first channel 104 and the second channel 106 for reception of the first signal and the second signal, respectively. The speech enhancement system may execute operations comprising receiving a first signal and a second signal from a determined source, obtaining a processed signal from the received first signal and the second signal, obtaining a reference noise signal from the received second signal, and determining a processed speech signal from filtration of the reference noise signal from the processed signal. The first channel 104 and the second channel 106 may receive the first signal and the second signal from the determined source. The first signal comprises at least one of the speech signal or the one or more noise signals, and the second signal comprises at least one of the speech signal or the one or more noise signals. The first pre-processor 208 may obtain the processed signal based on the received first signal and the received second signal for amplification of a gain associated with the speech signal present in the received first signal and the second signal. An SNR associated with the processed signal may be greater than or equal to a threshold value. The second pre-processor 210 may obtain the reference noise signal from the received second signal based on subtraction of an estimated speech signal present in the received second signal from the processed signal. The post-processor 212 may determine the processed speech signal based on filtration of the obtained reference noise signal from the obtained processed signal.

While the present disclosure has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, various embodiments described above may be combined with each other.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for adaptive enhancement of speech signals.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a plurality of circuits in a signal processing apparatus, wherein
the plurality of circuits comprise at least a first speech transducer, a second speech transducer, and
the plurality of circuits are configured to:
receive a first signal via the first speech transducer and a second signal via the second speech transducer from determined sources,
wherein the first signal comprises a speech signal and at least one noise signal, and
wherein the second signal comprises the speech signal and the at least one noise signal;
estimate a component of noise corresponding to the at least one noise signal in the received second signal;
filter the estimated component of noise from the received second signal;
obtain a filtered second signal that comprises at least one of the speech signal or a reverberated speech signal;
obtain a single speech signal with a first phase and a first gain that matches with corresponding second phase and second gain of the speech signal in the first signal, based on a modification of the at least one of the speech signal or the reverberated speech signal in the filtered second signal;
obtain a processed signal based on an addition of the received first signal and the single speech signal,
wherein the processed signal corresponds to amplification of a first gain associated with the speech signal in the received first signal and the second signal by a determined factor,
wherein a signal-to-noise ratio (SNR) associated with the processed signal is greater than or equal to a threshold value;
evaluate a first acoustic impulse response between a speech source and the second speech transducer and a second acoustic impulse response between the speech source and the first speech transducer;
obtain an estimate of the speech signal in the received second signal based on the estimated component of noise and a ratio of the first acoustic impulse response and the second acoustic impulse response;
obtain a reference noise signal from the received second signal based on subtraction of the estimated speech signal in the received second signal from the processed signal;
filter the obtained reference noise signal based on subtraction of the obtained reference noise signal from the obtained processed signal; and
determine a processed speech signal based on the filtration of the obtained reference noise signal.

2. The system according to claim 1,
wherein at least one circuit of the plurality of circuits is configured to determine a noise path impulse response corresponding to a noise path and a speech path impulse response corresponding to a speech path,
wherein the noise path corresponds to a path of reception of the at least one noise signal, and
wherein the speech path corresponds to a path of reception of the speech signal.

3. The system according to claim 1, wherein at least one circuit of the plurality of circuits is configured to:
determine each formant in a set of formants in the speech signal in the first signal, wherein each formant corresponds to a resonant frequency bin in the speech signal;
identify a defined number of frequency bins of a defined window size adjacent to each determined formant in the set of formants in a specified pattern for adaptation to the speech signal in the received first signal; and
estimate an adapted step-size corresponding to each determined formant and each frequency bin of the identified defined number of frequency bins in the speech signal in the received first signal; and
filter the speech signal from the first signal based on the estimated step-size.

4. The system according to claim 1, wherein at least one circuit of the plurality of circuits is configured to implement a sparseness controlled proportionate multiline delay filtering technique for determination of each formant and corresponding frequency bins in the speech signal of the received first signal.

5. The system according to claim 1, wherein the determined factor by which the gain is amplified is 2.

6. The system according to claim 1, wherein at least one circuit of the plurality of circuits is configured to:
obtain the estimate of the speech signal in the received second signal based on a correlation of the speech signal in the first signal and the speech signal in the second signal.

7. A method, comprising:
in a signal processing apparatus that comprises a plurality of circuits:
receiving, by at least one circuit of the plurality of circuits, a first signal via a first speech transducer and a second signal via a second speech transducer from a determined source,
wherein the first signal comprises a speech signal and at least one noise signal, and
wherein the second signal comprises the speech signal and the at least one noise signal;
estimating a component of noise corresponding to the at least one noise signal in the received second signal;
filtering the estimated component of noise from the received second signal;
obtaining a filtered second signal that comprises at least one of the speech signal or a reverberated speech signal;
obtaining a single speech signal with a first phase and a first gain that matches with corresponding second phase and second gain of the speech signal in the first signal, based on a modification of the at least one of the speech signal or the reverberated speech signal in the filtered second signal;
obtaining, by at least one circuit of the plurality of circuits, a processed signal based on an addition of the received first signal and the single speech signal,
wherein the processed signal corresponds to amplification of a first gain associated with the speech signal in the received first signal and the second signal by a determined factor,
wherein a signal-to-noise ratio (SNR) associated with the obtained processed signal is greater than or equal to a threshold value;
evaluating a first acoustic impulse response between a speech source and the second speech transducer and a second acoustic impulse response between the speech source and the first speech transducer;

obtaining an estimate of the speech signal in the received second signal based on the estimated component of noise and a ratio of the first acoustic impulse response and the second acoustic impulse response;

obtaining, by at least one circuit of the plurality of circuits, a reference noise signal from the received second signal based on subtraction of the estimated speech signal in the received second signal and the obtained processed signal;

filtering the obtained reference noise signal based on subtraction of the obtained reference noise signal from the obtained processed signal; and determining, by at least one circuit of the plurality of circuits, a processed speech signal based on the filtration of the obtained reference noise signal from the obtained processed signal.

8. The method according to claim 7, further comprising determining, by at least one circuit of the plurality of circuits, a noise path impulse response corresponding to a noise path and a speech path impulse response corresponding to a speech path, wherein the noise path corresponds to a path of reception of the at least one noise signal, and wherein the speech path corresponds to a path of reception of the speech signal.

9. The method according to claim 7, further comprising:

determining, by at least one circuit of the plurality of circuits, each formant in a set of formants in the speech signal in the first signal, wherein each formant corresponds to a resonant frequency bin in the speech signal;

identifying, by at least one circuit of the plurality of circuits, a defined number of frequency bins of a defined window size adjacent to each determined formant in the set of formants in a specified pattern for adaptation to the speech signal in the received first signal; and estimating, by at least one circuit of the plurality of circuits, an adapted step-size corresponding to each determined formant and each frequency bin of the identified defined number of frequency bins in the speech signal in the received first signal; and filtering, by at least one circuit of the plurality of circuits, the speech signal from the at least one noise signal based on the estimated step-size.

10. A signal processing apparatus, comprising:

a first speech transducer configured to receive a first signal from a determined source, wherein the first signal comprises a speech signal and at least one noise signal;

a second speech transducer configured to receive a second signal from the determined source, wherein the second signal comprises the speech signal and the at least one noise signal;

a first pre-processor configured to:

estimate a component of noise corresponding to the at least one noise signal in the received second signal;

filter the estimated component of noise from the received second signal;

obtain a filtered second signal that comprises at least one of the speech signal or a reverberated speech signal;

obtain a single speech signal with a first phase and a first gain that matches with corresponding second phase and second gain of the speech signal in the first signal, based on a modification of the at least one of the speech signal or the reverberated speech signal in the filtered second signal;

obtain a processed signal based on an addition of the received first signal and the single speech signal, wherein the processed signal corresponds to amplification of a first gain associated with the speech signal in the received first signal and the second signal by a determined factor, wherein a signal-to-noise ratio (SNR) associated with the obtained processed signal is greater than or equal to a threshold value;

a second pre-processor configured to:

evaluate a first acoustic impulse response between a speech source and the second speech transducer and a second acoustic impulse response between the speech source and the first speech transducer;

obtain an estimate of the speech signal in the received second signal received based on the estimated component of noise and a ratio of the first acoustic impulse response and the second acoustic impulse response; and obtain a reference noise signal based on subtraction of the estimated speech signal in the received second signal from the processed signal; and a post-processor configured to:

filter the obtained reference noise signal based on subtraction of the obtained reference noise signal from the obtained processed signal; and determine a processed speech signal based on the filtration of the reference noise signal from the processed signal.

11. The signal processing apparatus according to claim 10, wherein the first speech transducer is positioned at a first location and the second speech transducer is positioned at a second location, and wherein the first location of the first speech transducer is pre-specified with respect to the second location of the second speech transducer.

12. The signal processing apparatus according to claim 10, wherein the first pre-processor is associated with a desired response, wherein the desired response is based on a noise path and a speech path, wherein the noise path corresponds to a path of reception of the at least one noise signal from at least one of the first speech transducer or the second speech transducer, wherein the speech path corresponds to a path of reception of the speech signal from the at least one of the first speech transducer or the second speech transducer, and wherein the desired response is inversely proportional to a difference in a speech path impulse response and a noise path impulse response.

13. The signal processing apparatus according to claim 10, wherein the first pre-processor is further configured to determine a noise path impulse response corresponding to a noise path and a speech path impulse response corresponding to a speech path, wherein the noise path corresponds to a path of reception of the at least one noise signal from at least one of the first speech transducer or the second speech transducer, and wherein the speech path corresponds to a path of reception of the speech signal from the at least one of the first speech transducer or the second speech transducer.

14. The signal processing apparatus according to claim 10, wherein the first pre-processor is further configured to adapt to filter the speech signal based on reception of the speech signal from a speech path corresponding to the first speech transducer;

determine each formant in a set of formants in the speech signal in the first signal received from the first speech transducer, wherein each formant corresponds to a resonant frequency bin in the speech signal;

identify a defined number of frequency bins of a defined window size adjacent to each determined formant in the set of formants in a specified pattern for adaptation to the speech signal in the received first signal; and estimate an adapted step-size corresponding to each determined formant and each frequency bin of the identified defined number of frequency bins in the speech signal in the received first signal; and filter the speech signal from the received first signal based on the estimated step-size.

15. The signal processing apparatus according to claim 10, wherein the first pre-processor is further configured as a sparseness controlled multiline delay filter for determination of each formant and corresponding frequency bins in the speech signal of the first signal.

16. The signal processing apparatus according to claim 10, wherein each of the first speech transducer and the second speech transducer is a microphone, wherein the first pre-processor is an adaptive beamformer, wherein the second pre-processor is a speech remover, and wherein the post-processor is an adaptive noise canceller.

17. The signal processing apparatus according to claim 10, wherein the second pre-processor comprises a first filter and a second filter, wherein the first filter is configured to filter a component of noise in the processed signal received from the first pre-processor, wherein the second filter is configured to filter the estimated speech signal from the received second signal to obtain the reference noise signal, and wherein the second filter receives the filtered first signal from the first filter as a reference signal for the speech signal to remove the estimated speech signal from the received second signal.

18. The signal processing apparatus according to claim 17, wherein the first filter in the second pre-processor is a Weiner filter, wherein the second filter in the second pre-processor is a short adaptive filter, and wherein the first filter in the second pre-processor is coupled to the second filter in the second pre-processor.

19. The signal processing apparatus according to claim 17, wherein the second filter in the second pre-processor is adapted for a speech estimation error, wherein the speech estimation error is based on reception of the speech signal from the first speech transducer and the second speech transducer, and wherein the second filter is configured to:

determine each formant in a set of formants in the speech signal in the received second signal from the second speech transducer; and set a step-size and a set of coefficients of the second filter for the adaptation of the second filter to the speech estimation error, wherein the set of coefficients is initialized with zero value based on absence of the speech signal in a speech path of the second speech transducer.

20. The signal processing apparatus according to claim 10, wherein the speech signal from a determined speech source is detected based on the at least one of the speech signal or the at least one noise signal from the first speech transducer and the second speech transducer.

21. The signal processing apparatus according to claim 10, wherein at least the first signal and the second signal comprise at least one silence region, wherein the at least one silence region occurs at least one time interval within the first signal or the second signal.

* * * * *